(12) United States Patent
Yakushiji et al.

(10) Patent No.: US 7,525,719 B2
(45) Date of Patent: Apr. 28, 2009

(54) PARTICLES AND DEVICE FOR DISPLAYING IMAGE

(75) Inventors: Gaku Yakushiji, Tokyo (JP); Hajime Kitano, Tokyo (JP); Kazuya Murata, Tokyo (JP); Norio Nihei, Tokyo (JP); Koji Takagi, Kanagawa (JP); Yoshitomo Masuda, Tokyo (JP); Takahiro Kawagoe, Saitama (JP)

(73) Assignee: Bridgestone Corporation, Tokyo (JP)

( * ) Notice: Subject to any disclaimer, the term of this patent is extended or adjusted under 35 U.S.C. 154(b) by 601 days.

(21) Appl. No.: 10/490,154

(22) PCT Filed: Sep. 19, 2002

(86) PCT No.: PCT/JP02/09620

§ 371 (c)(1),
(2), (4) Date: Mar. 18, 2004

(87) PCT Pub. No.: WO03/027764

PCT Pub. Date: Apr. 3, 2003

(65) Prior Publication Data

US 2005/0001810 A1      Jan. 6, 2005

(30) Foreign Application Priority Data

| Sep. 19, 2001 | (JP) | 2001-284843 |
| Sep. 19, 2001 | (JP) | 2001-284845 |
| Sep. 21, 2001 | (JP) | 2001-289422 |
| Sep. 21, 2001 | (JP) | 2001-289423 |
| Oct. 11, 2001 | (JP) | 2001-313420 |
| Oct. 11, 2001 | (JP) | 2001-313421 |
| Oct. 11, 2001 | (JP) | 2001-313422 |
| Oct. 11, 2001 | (JP) | 2001-313423 |
| Oct. 18, 2001 | (JP) | 2001-320966 |
| Oct. 18, 2001 | (JP) | 2001-320967 |
| Oct. 18, 2001 | (JP) | 2001-320968 |
| Dec. 6, 2001  | (JP) | 2001-373290 |
| Dec. 27, 2001 | (JP) | 2001-396743 |
| Dec. 27, 2001 | (JP) | 2001-396744 |
| Dec. 27, 2001 | (JP) | 2001-396745 |
| Dec. 27, 2001 | (JP) | 2001-396746 |
| Dec. 27, 2001 | (JP) | 2001-396747 |
| Dec. 27, 2001 | (JP) | 2001-396748 |

(51) Int. Cl.
*G02B 26/00* (2006.01)
*G09G 3/34* (2006.01)

(52) U.S. Cl. ..................... 359/296; 345/107

(58) Field of Classification Search ............... 359/296; 345/107; 430/32; 204/600
See application file for complete search history.

(56) References Cited

U.S. PATENT DOCUMENTS 5,178,984 A    1/1993    Nagatsuka et al.

(Continued)

FOREIGN PATENT DOCUMENTS

JP      59-007348      1/1984

(Continued)

*Primary Examiner*—William C Choi
(74) *Attorney, Agent, or Firm*—Sughrue Mion, PLLC

(57) ABSTRACT

The present invention intends to provide particles for displaying images used in an image display device capable of displaying and eliminating repeatedly accompanied by flight and movement of particles utilizing Coulomb force, being superior in stability, particularly in repetition durability, memory characteristic stability, adaptability for temperature change, having capability of regulating charge amount, and accordingly, favorable images with sufficient contrast should be stably obtained. The present invention provides particles coated with a resin; specifying Span of particle diameter distribution, charge attenuation property, thermal change of the surface hardness, tensile break strength, Izod impact strength (with a notch), abrasion loss (Taber), tensile elastic modulus, flexural elastic modulus, or tear strength. The present invention also proposes about the structure of the particles.

13 Claims, 8 Drawing Sheets

U.S. PATENT DOCUMENTS

| | | |
|---|---|---|
| 6,025,896 A | 2/2000 | Hattori et al. |
| 6,407,763 B1 * | 6/2002 | Yamaguchi et al. ......... 347/112 |
| 6,693,621 B1 | 2/2004 | Hayakawa et al. |
| 6,800,368 B2 | 10/2004 | Shigehiro et al. |
| 6,816,146 B2 | 11/2004 | Harada et al. |

FOREIGN PATENT DOCUMENTS

| | | |
|---|---|---|
| JP | 62-183439 | 8/1987 |
| JP | 02-243784 | 4/1992 |
| JP | 2000-089261 | 2/2000 |
| JP | 2000-066248 | 3/2000 |
| JP | 2000-227612 | 8/2000 |
| JP | 2001-033833 | 2/2001 |
| JP | 2001215539 A * | 8/2001 |

* cited by examiner

Preparation of Printing Plate

Application of Paste - Pressing

Transfer of Paste

Curing Paste

Repetition of the Steps Above

Application of Paste

Photoresist Film

Exposure - Development

Sandblast

Removing Resist Film

Adhering Photoresist Film

Exposure - Etching

Paste Injection - Curing

Removing Photoresist Film

PARTICLES AND DEVICE FOR DISPLAYING IMAGE

FIELD OF THE INVENTION

The present invention relates to particles for displaying images used in an image display device that enables to repeatedly display or eliminate accompanied by flight and movement of fine particles utilizing Coulomb force and the image display device with the use of the particles.

BACKGROUND ART

As an image display device substitutable for liquid crystal device (LCD), image display device (a display) with the use of technology such as an electrophoresis method, an electrochromic method, a thermal method, two colors of particle-rotary method is proposed.

As for these image display device, it is conceivable as inexpensive visual display device of the next generation from a merit having wide field of vision close to normal printed matter, having smaller consumption power, and having a memory capability in comparison with LCD, spreading out to a display for portable device, and an electronic paper is expected.

Recently, electrophoresis method is proposed that micro-encapsulate dispersion liquid made up with dispersion particles and coloration solution and dispose the liquid between faced substrates. However, in the electrophoresis method, there is a problem of lacking imaging repetition stability, because particles with high specific gravity of titanium oxide is scattered within solution of low specific gravity, it is easy to subside, difficult to maintain a stability of dispersion state, and difficult in long-term conservation to add dye in solution to render a color. Even in the case of micro-encapsulation, cell size is diminished to a microcapsule level in order to make it hard to appear, however, an essential problem was not overcome at all.

Besides the electrophoresis method using behavior in the solution as above-mentioned, recently, a device for displaying wherein two kinds of toner particles which are different in a color of charging polarity are placed between a pair of substrates, and an electric field is given to fly and fix the particles to the substrates in different direction without using solution is proposed. [The Imaging Society of Japan "Japan Hardcopy'99" (Jul. 21-23, 1999) Transaction Pages 249-252, etc.]

Movement mechanism of such a dry visual display device employs as display device with material mixed two kinds in color and charging polarity are an electrode substrate and apply the voltage to generate an electric field between electrode substrates for flying the charged particle which have different polarity to a different direction.

The above-mentioned dry process image display device using particles behavior in a gas comprising particles and a substrate without using any solution, there are advantage that a problem such as sedimentation and aggregation of the particles in the electrophoresis method is solved and transfer resistance of particles is small to make response speed is faster.

However, with such a dry visual display device, there were the problems as the following:

(1) Structure becomes complicated to dispose the electric charge transportation layer in one part of a substrate, and a layer of charge production, which make it difficult to escape an electric charge from an electroconductive particle constantly, resulting in a lack of stability.

(2) Driving voltage becomes greatly large which make it impossible to move particles unless several hundred volts, comparing to an electrophoresis method of which particle movement was possible at around several tens of volts.

(3) Charge amount of particle itself is a most important parameter in controlling the force generating by an electric field and adhesive force between the particles and an electrode substrate.

However, it is difficult that precision control of charge amount in particle in itself because charge characteristic of particles is influenced by materials of particle itself.

In addition, when it is considered that fine particles as display element, a color toner of the particle is required to be white or black so that contrast becomes clear. On the contrary, as polymer fine particles of general-purpose resin render a clear color, when it became fine particles, it is possible to employ as particles for white by diffused reflection of light. However, to get a black particle, it is necessary to add color and dye of carbon in a polymerization process of the particle which make it very difficult to achieve.

(4) It is necessary to reduce adhesive force between particles or between particles and substrates to move particles stably and repeatedly. For this purpose, the method of coating particles with low adhesive resin is conceivable; however, a crush process is necessary because particles cohere at the time of drying in normal wet processing.

(5) The particles were generally prepared as spherical particles using such method as suspension polymerization or emulsion polymerization dispersing droplets of resin particles into an aqueous disperse medium, and in the case where white particles are prepared, they contains titanium oxide, zinc oxide, silicon oxide as a coloring material. These coloring materials are difficult to be contained uniformly and sufficiently to the aqueous disperse medium because they have heavy specific gravity and higher affinity to water than the droplets.

Additionally, even an indefinite particle of a single resin appears as white by diffused reflection of light at the surface, however, in the image display device of flying and moving particles, a spherical particle is ideal in the viewpoint of fluidity. However, the indefinite particle is hard to fly restricted by a structural disturbance thereby requiring a great driving voltage.

(6) The particles were generally prepared as spherical particles using such method as suspension polymerization or emulsion polymerization dispersing droplets of resin particles into an aqueous disperse medium, however, they must be characterized by either positive or negative by the polarity of the applied voltage so as to determine a flying direction, and enough charge amount is required for achieving highly efficient flight and movement.

(7) In an occasion of forming an electric field, an ideal flight of particles is not realized, and contrast of a display screen is insufficient for displaying favorable images stably.

The object of the present invention is to provide particles for displaying images and image display device having the following characteristic under the situation as above-mentioned, overcoming the problems in dry image display devices.

(a) It is superior in stability and particularly in repetition durability.

(b) It is superior in stability and particularly in memory characteristics.

(c) It is superior in stability, and particularly in adaptive characteristics to a temperature change.

(d) Application of charges to the particle is sufficiently achieved and, when forming an electric field, an ideal flight of particles is realized resulting in displaying favorable images with enough contrast stably.
(e) Aggregation of the particles is prevented enabling to display images superior in stability.
(f) White is distinctly displayed with low driving voltage.
(g) The application of the character of either positive or negative to the particles and maintaining the charge amount are easy, and control of the charge amount is possible.
(h) When forming an electric field, an ideal flight of particles is realized to display favorable images with enough contrast stably.

As a result of repeated zealous study by the inventors of the present invention to achieve the object, they found the following knowledge and based on the knowledge, they completed the present invention.

(i) By preparing the ingredients for the particles coated with resin, the image display devices should be schemed for elevated capability and the durability of the image display device should be improved.
(ii) By preparing the ingredients for the particles with a small Span of the particle diameter distribution, an image with a great contrast ratio should be obtained and durability should be improved.
(iii) By preparing the ingredients for the particles with slow charge attenuation, an image display device superior in stability and, particularly, in memory characteristic should be obtained.
(iv) By preparing the ingredients for the particles regulating the ratio between the surface hardness at the temperature of 0° C. and the surface hardness at the temperature of 100° C., an image display device superior in stability and, particularly, in response to the change of the temperature should be obtained.
(v) By preparing the ingredients for the particles regulating the tensile break strength, an image display device superior in stability and, particularly, in response to the change of the temperature should be obtained.
(vi) By preparing the ingredients for the particles regulating Izod impact strength, an image display device superior in stability and, particularly, in response to the change of the temperature should be obtained.
(vii) By preparing the ingredients for the particles regulating the abrasion loss (Taber), an image display device superior in stability and, particularly, in response to the change of the temperature should be obtained.
(viii) By preparing the ingredients for the particles regulating the tensile elastic modulus, an image display device having capability of displaying the images superior in stability and, particularly, in repetition durability should be obtained.
(ix) By preparing the ingredients for the particles regulating the flexural elastic modulus, an image display device having capability of displaying the images superior in stability and, particularly, in repetition durability should be obtained.
(x) By preparing the ingredients for the particles regulating the tear strength, an image display device having capability of displaying the images superior in stability and, particularly, in repetition durability should be obtained.
(xi) By preparing a group of combined particles comprising mother particles whereon many child particles of at least one kind adhere, an image display device having capability of displaying the images superior in repetition durability at a low driving voltage, cheap, and achieving the compatibility of improving stability and reducing the driving voltage should be obtained.
(xii) By preparing the ingredients for the particles obtained by surface treating fine particles with a solution of charge control agent, attachment of charging ability over the particles should be sufficiently carried out and an ideal flight and movement should be realized in an occasion of forming an electric field, and accordingly, favorable images with sufficient contrast should be stably obtained.
(xiii) By preparing the ingredients for the particles obtained by resin coating them by means of spraying a solution of dissolving resin, an aggregation of the particles should be prevented and favorable images with extended longevity against repeating display and with superior stability should be easily obtained.
(xiv) By preparing the ingredients for the particles at least one resin layer is formed as an outer layer over a spherical central component by coating a resin comprising a component whose index of refraction is different from that of the central component, an image display device having capability of displaying white clearly, quickly responsive, and superior in repetition durability at a low driving voltage should be obtained.
(xv) By preparing the ingredients for the particles involving indefinite particles, around which at least one resin layer is formed by coating a resin comprising a component whose index of refraction is different from that of the indefinite particles An image display device having capability of displaying white clearly, quickly responsive, and superior in repetition durability at a low driving voltage should be obtained.
(xvi) By preparing the ingredients for the particles containing a resin component prepared by polymerizing at least one kind of monomer selected from acrylic monomer, methacrylic monomer and styrenic monomer, an image display device easily determining positive or negative and ensuring surface charge density, capable of charge control by the selection of the monomer or blending ratio, quickly responsive, and superior in repetition durability at a low driving voltage should be obtained.
(xvii) By preparing the ingredients for the particles contained in a mixture obtained by blending at least two kinds of said particles different in both color and charge characteristic, and by settling a difference between each surface charge density within the range of 2 to 150 μC/m², an ideal flight and movement of particle under the formation of the electric field should be realized and accordingly, favorable images with sufficient contrast and without any unevenness should be stably obtained.

Namely, the present invention provides particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) they are coated with a resin;
(2) Span of particle diameter distribution defined by the following equation is less than 5:

$$\text{Span}=(d_{0.9}-d_{0.1})/d_{0.5}$$

wherein $d_{0.1}$ represents a particle diameter (μm) of the particles whose ratio of particles equal to or less than it is 10%, $d_{0.5}$ represents a particle diameter (μm) defining that 50% of the particles are greater than this, and another 50% of the particles are smaller than this, $d_{0.9}$ represents a particle diameter of the particles whose ratio of particles equal to or smaller than it is 90% each in the particle diameter distribution;
(3) in the case where the surfaces of the particles are charged by applying a voltage of 8 kV onto a Corona generator deployed at a distance of 1 mm from the surface of the particles, a surface potential of the particle 0.3 second after the discharge is greater than 300 V;
(4) a ratio between a surface hardness at 0° C. and a surface hardness at 100° C. is 1.7 or smaller;
(5) tensile break strength is 20 MPa or greater;
(6) Izod impact strength (with a notch) is 100 J/m or greater;
(7) abrasion loss (Taber) is 22 mg or less;
(8) tensile elastic modulus is 24.5 MPa or greater;
(9) flexural elastic modulus is 44.1 MPa or greater;
(10) tear strength is 100 kg/cm or greater;
(11) they are a group of combined particles comprising mother particles whereon many child particles of at least one kind adhere;
(12) they are obtained by surface treating fine particles by the use of a solution of charge control agent;
(13) they are coated with a resin by spraying a solution prepared by dissolving resin;
(14) at least one resin layer is formed as an outer layer over a spherical central component by coating a resin comprising a component whose index of refraction is different from that of the central component;
(15) they involve an indefinite particles around which at least one resin layer is formed by coating a resin comprising a component whose index of refraction is different from that of the indefinite particle; or
(16) they contain a resin component prepared by polymerizing at least one kind of monomer selected from acrylic monomer, methacrylic monomer and styrenic monomer.

The present invention also provides an image display device with the use of the particle.

Figure 1:
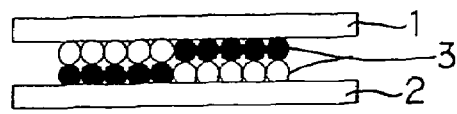
FIG. 1 is an illustration showing a structure of an image display device of the present invention.

EXPLANATIONS OF NUMERICAL SYMBOLS ARE AS FOLLOWS 1,2: substrate
3: particles
4: partition wall
5: spacer
6: resin
7: roll shape charge member
8: shaft
9: chuck
10: corotron discharger
11: surface potential instrument

THE MOST PREFERRED EMBODIMENT TO CARRY OUT THE INVENTION

An image display device with the use of the particles for displaying images of the present invention displays images by flying and moving at least one group of particles enclosed between a pair of facing substrates of which at least one is transparent and across the substrates, an electric field being applied.

FIG. 1 is an illustration showing a structure of the image display device. In FIG. 1, substrate 1 and substrate 2 are facing with each other at a predetermined distance and at least one kind of particles are enclosed. (There are two kinds of particles with different colors in FIG. 1.) At least one of substrate 1 or substrate 2 is a transparent substrate enabling to recognize the color of the particle from outside, and a material with a great transmittance of visible light and a great heat-resistance is preferable.

The presence of flexibility as the image display device is selected appropriately by the use, for example, the flexible materials are selected for the use as an electronic paper and so on, materials without flexibility are selected for the use as display units for portable devices such as cellular phones, PDAs, notebook-sized personal computers.

Examples of the forces acting on the particle for the image display device include an attracting force caused by Coulomb force between particles, an intermolecular force, Coulomb force with an electrode plate, water bridging power, and gravity.

When the force working on particles by an electric field exceeds these general forces in the relative forces with each other, a flight and movement of the particle itself occurs, and accordingly, various kinds of characteristics are required for the particle for displaying images.

The ingredients for the particles for displaying images of the present invention satisfies the required various kinds of characteristics by satisfying at least any one of the foregoing requirements (1) to (16).

The requirement (1) describing that the ingredients for the particles for displaying images are coated with a resin will be detailed below:

The ingredients for the particles for displaying images needs to be designed so as to move uniformly and stably with repetition, in other words, so as to receive Coulomb force, which is uniform and with little durability change.

However, in accordance with the prior art, it is difficult to make the charge characteristics of the particle important in Coulomb force and so on (particles movement) compatible with the color characteristic of the particle important in display. In fact, there is not any particle intentionally changing the charge characteristics and still with the same color. Means for fixing a charge control agent on the surface of the particle can be considered, however, because the surface of the particle is rubbed in a a reciprocating movement motion, it is difficult to give the charge characteristics of little durability change to the particle.

The foregoing requirement (1) overcomes these problems by making the surface of the particles coated with the resin obtaining desired charge characteristics and thereby regulating the charge characteristics by means of selecting the kind of the resins precisely and quantitatively with the same color. Further, by increasing the thickness of the resin to a considerable value, the particle for displaying images provides the charge characteristics of little durability change even though it is rubbed and worn in a reciprocating motion, because there will be the same kind of resin on the surface of the particles.

Moreover, in an occasion of satisfying the foregoing requirement (1), by selecting a resin with quick charge attenuation as the coating resin, the particles can be designed to easily drivable and to have a superior long-term storage property. Specifically, when the particles for displaying images move, it becomes possible to effectively move the particles even with a low voltage by making the charge held surely over the surface of the particles. Besides, in a case where the image is not displayed or is stored in a memory, an aggregation of positively charged particles and negatively charged particles should be reduced to improve long-term storage property by promoting the charge to leak from the surface of the particles.

Accordingly, the foregoing requirement (1) overcomes the ambivalent problem in conventional dry-type image display device that with the use of particles having highly sensitive charge characteristics, the particles move swiftly but aggregate in long-term storage, and with the use of particles having poorly sensitive charge characteristics, the particles do not aggregate each other but hardly move to reveal an image display.

Figure 5:
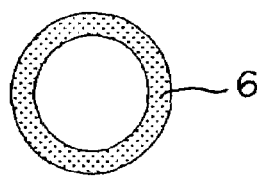
FIG. 5 is a figure showing a structure of particles coated with resin.

Therefore, the ingredients for the particles for displaying images satisfying the foregoing requirement (1) of the present invention are coated with resin 6 as shown in FIG. 5.

The particles to be coated may be any materials exemplified below and having a desired color and capable of being coated, however, spherical particles with a small specific gravity is preferable.

Typical examples of the inorganic particles include titanium oxide, zinc white, zinc sulfide, antimony oxide, calcium carbonate, white lead, talc, silica, calcium silicate, alumina white, cadmium yellow, cadmium red, cadmium orange, titanium yellow, Berlin blue, sea blue, cobalt blue, cobalt green, cobalt violet, iron oxide, carbon black, manganese ferrite black, cobalt ferrite black, copper powders, and aluminum powders.

Typical examples of the organic polymer particle include urethane-based, nylon-based, fluorine-based, silicone-based, melamine-based, phenol-based, styrene-based, styrene acryl-based, and urethane acryl-based polymer particle.

They further include styrene acryl-based hollow particles (available from JSR Co., Ltd., etc.), or thermal expansion type hollow particles (available from Matsumoto Oils and Fats Co., Ltd., etc.).

These particles may be materials colored with pigments or dye. As a resin for coating the particles, although any materials capable of applying charge characteristics and of being coated to the particles are suitable, a selection of a resin with quick charge attenuation is preferable as described above.

Examples of the resin used for coating include urethane resin, acrylic resin, polyester resin, modified urethane acrylic resin, silicone resin, nylon resin, epoxy resin, styrene resin, butyral resin, vinylidene chloride resin, melamine resin, phenol resin, and fluorocarbon polymers; and two kinds or more of these may be mixed and used. Particularly preferable examples of positive charge applying resin include nylon resin, epoxy resin, and styrene acrylic resin; and particularly preferable examples of negative charge applying resin include fluorocarbon polymers, silicone resin, and acryl urethane fluorocarbon polymers.

As the resin with quick charge attenuation, it is preferable to select resin corresponding with the surface potential under the following measurement condition:

Namely, applying the voltage of 8 KV to a Corona generator disposed with a distance of 1 mm to the surface to generate Corona discharge, charging the surface, and then, measuring the change of the surface potential, determine the suitability. In this occasion, it is preferable to select the resin whose surface potential will be 300 V or lower after 0.3 seconds, more preferable to select the resin whose surface potential will be 200 V or less after 0.3 second as the resin used for coating.

Figure 6:
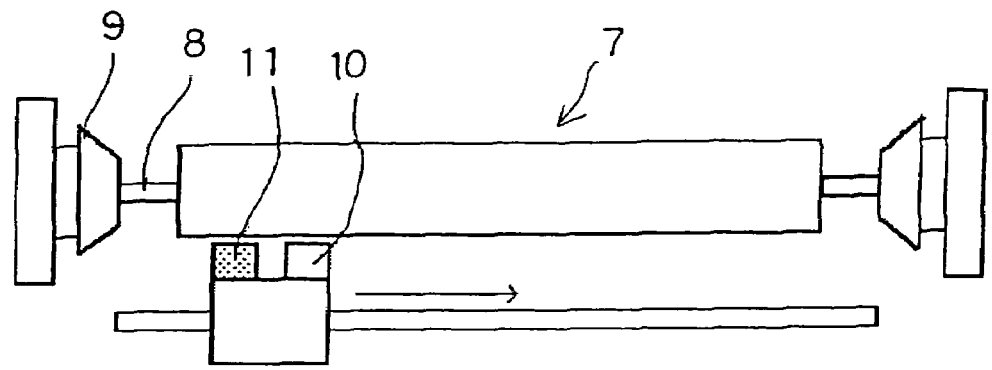
FIG. 6 is an illustration of CRT 2000 used for the measurement of surface potential.

Additionally, the foregoing surface potential is measured by means of CRT2000 produced by QEA Inc. (Quality Engineering Associates Inc.) in USA as shown in FIG. 6. In this instrument, both end portions of shaft 8 of roll shaped charge member 7 disposing a coating resin over the surface are held with chuck 9, compact corotron discharger 10 and surface potential meter 11 are spaced with predetermined interval to form a measurement unit. Facedly deploying the measurement unit with a distance of 1 mm from the surface of the particles to be coated, and by moving the measurement unit from one end portion of the charge member 7 to the other end portion with an uniform speed, with the state that the charge member 7 remains stopping and while giving surface charge, a method of measuring its surface potential is preferably adopted. Moreover, measurement environment should be settled at the temperature of 25±3° C. and the humidity of 55±5% RH.

Examples of means for coating the resin over the particles include disper coat, coatmizer, and Henschel mixer.

The disper coat consists of a powder feeding part at the upper portion and a multistage distributor that can supply liquid in multistage from the crosswise direction, which controls the operating condition of this multistage distributor for attaching the liquid component to the surfaces of the particles, and is able to carry out the operation of making the surfaces of the particles wet with the liquid in an extremely short time.

The coatmizer provides a resin coating method over the surfaces of electro conductive particles by supplying the particles to be coated into a jet flow to form a dispersed layer, and colliding mist flow at a position parallel to the dispersed layer and made with fine particles of a droplet containing the particles to be coated into the coated particles.

As for the amount of resinous coating, 0.01 to 30% by weight to the particles is preferable, and 0.01 to 10% by weight is more preferable.

Further, an electric charge control agent, a coloring agent, an inorganic additive (lubricant) may be optionally added to the resin for coating in order to assist the charge characteristics or a color characteristic.

Examples of the electric charge control agent include, but not particularly specified to, negative charge control agent such as salicylic acid metal complex, metal-containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative.

Examples of the positive charge control agent include nigrosine dye, triphenylmethane compound, the fourth grade ammonium salt compound, polyamine resin, and imidazole derivatives.

Additionally, metal oxides such as ultra-fine particles of silica, ultra-fine particles of titanium oxide, ultra-fine particles of alumina, and so on; nitrogen-containing circular compound such as pyridine, and so on, and these derivatives or salts; and resins containing various organic pigments, fluorine, chlorine, nitrogen, etc. can be employed as the electric charge control agent.

As for a coloring agent, various kinds of organic or inorganic pigments or dye as will be described below are employable:

Examples of black pigments include carbon black, copper oxide, manganese dioxide, aniline black, and activated carbon.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, and tartrazinelake.

Examples of orange pigments include red chrome yellow, molybdenum orange, permanent orange GTR, pyrazolone orange, Balkan orange, Indusren brilliant orange RK, benzidine orange G, and Indusren brilliant orange GK.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, and brilliant carmine 3B.

Examples of purple pigments include manganese purple, first violet B, and methyl violet lake.

Examples of blue pigments include Berlin blue, cobalt blue, alkali blue lake, Victoria blue lake, phthalocyanine blue, metal-free phthalocyanine blue, partially chlorinated phthalocyanine blue, first sky blue, and Indusren blue BC.

Examples of green pigments include chrome green, chromium oxide, pigment green B. Malachite green lake, and final yellow green G.

Examples of extenders include baryta powder, barium carbonate, clay, silica, white carbon, talc, and alumina white.

Furthermore, there are Nigrosine, Methylene Blue, rose bengal, quinoline yellow, and ultramarine blue as various dyes such as basic dye, acidic dye, dispersion dye, direct dye, etc.

These coloring agents may be used alone or in combination of two or more kinds thereof.

Examples of inorganic additives include titanium oxide, zinc white, zinc sulfide, antimony oxide, calcium carbonate, white lead, talc, silica, calcium silicate, alumina white, cadmium yellow, cadmium red, cadmium orange, titanium yellow, Berlin blue, sea blue, cobalt blue, cobalt green, cobalt violet, iron oxide, carbon black, manganese ferrite black, cobalt ferrite black, copper powders, and aluminum powders.

Next, the foregoing requirement (2) describing that the ingredients for the particles for displaying images have Span of specific particle diameter distribution will be detailed below:

In conventional image display device, even if the same voltage (an electric field) is applied repeatedly, repeatability of particles movement falls larger than expectation, so that the durability of image display is not obtained.

In requirement (2), because positively charged particles and negatively charged particles move toward opposed direction each other induced by an influence other than Coulomb force, considering that the physical influence in this occasion is important, the particle diameter distribution and the shape of each particle were quantitatively combined as optimum.

Namely, the requirement (2) requires Span of particle diameter distribution defined by the following equation is less than 5, preferably less than 3:

$$\text{Span}=(d_{0.9}-d_{0.1})/d_{0.5}$$

wherein $d_{0.1}$ represents a particle diameter (μm) of the particles whose ratio of particles equal to or less than it is 10%, $d_{0.5}$ represents a particle diameter (μm) defining that 50% of the particles are greater than this, and another 50% of the particles are smaller than this, $d_{0.9}$ represents a particle diameter of the particles whose ratio of particles equal to or smaller than it is 90% each in the particle diameter distribution.

By regulating Span within less than 5, sizes of each particles become uniform, and then uniform movement of the particles becomes possible.

Next, the foregoing requirement (3) describing that the ingredients for the particles for displaying images have a specified surface potential will be detailed below:

In conventional image display device, there is a problem that when particles with highly sensitive charge characteristics is used in order to make driving voltage low, particles movement occurs immediately, and although making driving voltage low is realized, the particles start aggregating after the repeated use because of its highly sensitive charge characteristics. Further, there is another problem that when particles with poorly sensitive charge characteristics is used in order to improve long term stability, although the aggregation between the particles is hard to occur and stability improves, charge characteristics of the particle will degrade. As a result, uniform particle movement will hardly happen and even when the particle reaches to the surface of the substrate, clear images cannot be displayed because the adhesion between the particles, and the surface of the substrate, so-called memory characteristics, is not sufficient.

In a common sense, a concept of using particles made up of a resin with high electric resistance for securing to get a clear image, particularly memory characteristics, is a matter of course. However, even by using the resin with high electric resistance, so-called insulation characteristics, it is not sure to achieve the memory characteristic as expected.

The requirement (3) is based on the knowledge that by specifying the surface potential of the particles, above-mentioned clear image, particularly improved memory characteristics, will be achieved.

Concretely, rather than the conventional idea of the electric resistance, a new finding about a leak of the electric charge and an attenuation characteristic is important, and as a result of designing particles showing an optimum charge attenuation characteristic in accordance with the appropriate evaluation method, the memory characteristic is improved by maintaining adhesive force of the particle with the surface of the substrate for a long time effectively.

Namely, the requirement (3) requires that in the case where the surface of the particles are charged by applying a voltage of 8 kV onto a Corona generator deployed at a distance of 1 mm from the surface of the particles A surface potential of the particle 0.3 second after the discharge is greater than 300 V.

In order to get particles of the foregoing surface potential, it is important that a resin composing the surfaces of the particles contains at least one resin with slow charge attenuation. In this occasion, the resin composing the surface of the particle includes the coating resin when the particle is coated with the resin satisfying the foregoing requirement (1). Accordingly, in satisfying the requirement (1), when the resin containing at least a resin with slow charge attenuation is used as the coating resin, it satisfies the requirement (3). Therefore, about the case where the entire particles are formed with a resin containing the resin with slow charge attenuation will be described below:

In the formation of the entire particles with a resin containing the resin with slow charge attenuation, the examples of the resin include, as the description with regard to the forgoing requirement (1) (they are coated with a resin), urethane resin, acrylic resin, polyester resin, urethane modified acrylic resin, silicone resin, nylon resin, epoxy resin, styrene resin, butyral resin, vinylidene chloride resin, melamine resin, phenol resin, and fluorocarbon polymers; and two or more kinds of these may be used in combination. For the purpose of controlling the adhesive force with the substrate, acryl urethane resin, acryl urethane silicone resin, acryl urethane fluorocarbon polymers, urethane resin, and fluorocarbon polymers are particularly preferable. Electric charge control agent, coloring agent, or inorganic additive may be optionally added in order to assist charge characteristics or color characteristics of the resin composing the particle. The same materials exemplified in the description regarding the requirement (1) (they are coated with a resin) are employable as these electric charge control agent, coloring agent, and inorganic additive.

Next, regulating a dynamic characteristic of the ingredients for the particles for displaying images, in other words, regulating the thermal change of the surface hardness, the tensile break strength, the Izod impact strength, the abrasion loss (Taber), the tensile elastic modulus, the flexural elastic modulus, and the tear strength [requirements (4) to (10)] will be described below:

In the image display device, it is necessary that the particles move uniformly and that the stability in a repeated image display or in storage is maintained not withstanding of the temperature change, in other words, it is necessary that the particles move uniformly and that the image stability is maintained both within the range of the temperature change.

However, in the conventional image display device, because a driving force for the particles was assumed to be important, the actual situation was that an electrical characteristic of the particles, what is called charge characteristic, was emphasized or that the characteristic which cannot be covered with an electrical characteristic of the particles is compensated by a driving method by means of a driving voltage.

For example, there is a problem that the use of particles with highly sensitive charge characteristic in order to make the driving voltage low causes particle movement immediately, and although making driving voltage low is realized, the particles begin to aggregate in a repeated use because of its highly sensitive charge characteristic. On the other hand, there is another problem that the use of particles with poorly sensitive charge characteristic in order to improve the repetition durability prevents the aggregation between particles and improves stability, however, the charge characteristic of the particles will degrade and uniform particle movement will hard to happen; and further, even though the particle reaches to the surface of the substrate, a clear image is hardly displayed because adhesion of the particle with the surface of the substrate, so-called memory characteristic is not sufficient.

A hint about an improvement of the stability is found that the dynamic characteristic of the particles is also important other than the charge characteristic of the particles and the driving method. The dynamic characteristic of the particles was not much a problem in moving particles in liquid as electrophoresis method; however, in the case of the particle movement in the dry image display device without liquid, it will be a particularly important factor.

The present invention includes regulating any one of the dynamic characteristic of the particle for displaying images, that is, a thermal change of surface hardness, a tensile break strength, Izod impact strength, an abrasion loss (Taber), a tensile elastic modulus, a flexural elastic modulus and a tear strength.

The foregoing requirement (4) requires that the thermal change of the surface hardness is restricted not to cause troubles in a reciprocating movement of the particles, in other words, to cause little change in a collision characteristic of the particles under the temperature change when the particles move.

Namely, the requirement (4) requires the ingredients for the particles for displaying images of the present invention to satisfy that a ratio between a surface hardness at 0° C. and a surface hardness at 100° C. is 1.7 or smaller, preferably 1.5 or smaller, and more preferably 1.3 or smaller.

When the ratio exceeds 1.7, a collision characteristic between particles in the reciprocating movement of the particles will change with the temperature change and accordingly, a desired stable image displays cannot be obtained.

Regarding the surface hardness of the resin composing particles, surface hardness at the temperature of 25° C. in accordance with JIS K7215 is preferably 40 degrees or greater, more preferably 50 degrees or greater, and still further preferably 60 degrees or greater. When the surface hardness of the resin is less than 40 degrees, one part of particles will be worn by the reciprocating movement of the particles, and electric charge control agent will fall down to cause some troubles on the movement of the particles themselves. Furthermore, the generated abrasion dregs will also cause troubles on the movement of the particles thereby resulting in deteriorating stable image display furiously. Additionally, the surface hardness is measured by means of durometer, and the unit will be D scale.

The foregoing requirement (5) regulates tensile break strength in order to prevent one part of particles from being worn by the reciprocating motion of the particles and to prevent the electric charge control agent from falling down to cause some troubles on the movement of the particle itself. Furthermore, the generation of any abrasion dregs will be prevented from causing troubles on the movement of the particles thereby resulting in the prevention of deteriorating stable image display furiously.

Namely, the requirement (5) requires tensile break strength of the ingredients for the particles to be 20 MPa or greater, preferably to be 30 MPa or greater. When the tensile break strength is less than 20 MPa, one part of particles will be worn by the reciprocating motion of the particles, and electric charge control agent will fall down to cause some troubles on the movement of the particles themselves. Furthermore, the generated abrasion dregs will also cause troubles on the movement of the particles thereby resulting in deteriorating stable image display furiously. Additionally, the tensile break strength is the value measured in accordance with JIS K7113.

The requirement (6) regulates Izod impact strength in order to prevent one part of particles from being worn by the reciprocating motion of the particles, and to prevent the electric charge control agent from falling down to cause some troubles on the movement of the particles themselves. Furthermore, the generation of any abrasion dregs will be prevented from causing troubles on the movement of the particles thereby resulting in the prevention of deteriorating stable image display furiously.

Namely, the requirement (6) requires the Izod impact strength (with a notch) of the ingredients for the particle to be 100 J/m or greater, preferably 130 J/m or greater. When the Izod impact strength (with a notch) is less than 100 J/m, one part of particles will be worn by the reciprocating motion of the particles, and electric charge control agent will fall down to cause some troubles on the movement of the particles themselves. Furthermore, the generated abrasion dregs will also cause troubles on the movement of the particles thereby resulting in deteriorating stable image display furiously. Additionally, the Izod impact strength is the value measured in accordance with ASTM D526 at the temperature of 23° C.

The requirement (7) regulates the abrasion loss (Taber) in order to prevent one part of particles from being worn by the reciprocating movement of the particles, and to prevent the electric charge control agent from falling down to cause some troubles on the movement of the particle itself. Furthermore, the generation of any abrasion dregs will be prevented from causing troubles on the movement of the particles thereby resulting in the prevention of deteriorating stable image display furiously.

Namely, the requirement (7) requires the abrasion loss (Taber) of the ingredients for the particles to be 22 mg or less, preferably 20 mg or less, and more preferably 15 mg or less. When the abrasion loss (Taber) exceeds 22 mg, one part of particles will be worn by the reciprocating motion of the particles and electric charge control agent will fall down to cause some troubles on the movement of the particles themselves. Furthermore, the generated abrasion dregs will also cause troubles on the movement of the particles thereby resulting in deteriorating stable image display furiously. Additionally, the abrasion loss (Taber) is the value measured in accordance with JIS K7204 under the condition of load 9.8 N for 1000 times.

The requirement (8) regulates the tensile elastic modulus in order to prevent one part of particles from being worn by the reciprocating motion of the particles, and to prevent the electric charge control agent from falling down to cause some troubles on the movement of the particles themselves. Furthermore, the generation of any abrasion dregs will be prevented from causing troubles on the movement of the particles thereby resulting in the prevention of deteriorating stable image display furiously.

Namely, the requirement (8) requires the tensile elastic modulus of the ingredients for the particles to be 24.5 MPa (250 kg/cm$^2$) or greater, preferably 29.4 MPa (300 kg/cm$^2$) or greater, and more preferably 39.2 MPa (400 kg/cm$^2$) or greater. When the tensile elastic modulus of the particles is less than 24.5 MPa, one part of particles will be worn by the reciprocating motion of the particles, and electric charge control agent will fall down to cause some troubles on the movement of the particles themselves. Furthermore, the generated abrasion dregs will also cause troubles on the movement of the particles thereby resulting in deteriorating stable image display furiously.

Additionally, the tensile elastic modulus is measured in accordance with JIS-K7113.

The requirement (9) regulates the flexural elastic modulus in order to prevent one part of particles from being worn by the reciprocating motion of the particles, and to prevent the electric charge control agent from falling down to cause some troubles on the movement of the particles themselves. Furthermore, the generation of any abrasion dregs will be prevented from causing troubles on the movement of the particles thereby resulting in the prevention of deteriorating stable image display furiously.

Namely, the requirement (9) requires the flexural elastic modulus of the ingredients for the particles to be 44.1 MPa (450 kg/cm$^2$) or greater, preferably 75.2 MPa (750 kg/cm$^2$) or greater, and more preferably 98.1 MPa (1000 kg/cm$^2$) or greater. When the flexural elastic modulus of the particles is less than 44.1 MPa, one part of particles will be worn by the reciprocating motion of the particles and electric charge control agent will fall down to cause some troubles on the movement of the particles themselves. Furthermore, the generated abrasion dregs will also cause troubles on the movement of the particles thereby resulting in deteriorating stable image display furiously.

Additionally, the flexural elastic modulus is measured in accordance with ASTM-D790.

The requirement (10) regulates the tear strength in order to prevent one part of particles from being worn by the reciprocating motion of the particles, and to prevent the electric charge control agent from falling down to cause some troubles on the movement of the particles themselves. Furthermore, the generation of any abrasion dregs will be prevented from causing troubles on the movement of the particles thereby resulting in the prevention of deteriorating stable image display furiously.

Namely, the requirement (10) requires the tear strength of the ingredients for the particles to be 100 kg/cm or greater, preferably 150 kg/cm or greater, and more preferably 200 kg/cm or greater. When the tear strength of the particles is less than 100 kg/cm, one part of particles will be worn by the reciprocating motion of the particles, and electric charge control agent will fall down to cause some troubles on the movement of the particles themselves. Furthermore, the generated abrasion dregs will also cause troubles on the movement of the particles thereby resulting in deteriorating stable image display furiously.

Additionally, the tear strength is measured in accordance with ASTM-D624, using a sample having the thickness of 2 mm.

Next, the foregoing requirement (11) describing that the ingredients for the particles for displaying images are a group of combined particles will be detailed below:

The requirement (11) specifies the ingredients for the particles for displaying images are a group of combined particles comprising mother particles whereon many child particles of at least one kind adhere.

In these combined particles, many child particles are used to cover up the surface of the mother particles, and one kind or a plural number of kinds may be employed.

It is important that the ratio (B/A) between the average particle diameter $d_{0.5}$ (A) of the mother particles and the average particle diameter $d_{0.5}$ (B) of the child particles in the combined particles is 20 or larger, preferably 100 or larger, and more preferably 300 or larger. Further, the diameter of the child particle is 1 µm or smaller, preferably 0.1 µm or smaller, more preferably 0.05 µm or smaller.

Additionally, $d_{0.5}$ represents a particle diameter (µm) defining that 50% of the particles are greater than this, and another 50% of the particles are smaller than this. (This definition is effective in all the description below.)

Furthermore, with regard to the particle diameter distribution of the mother particles, Span of particle diameter distribution defined by the following equation is less than 5, preferably less than 3:

Particle diameter distribution Span=$(d_{0.9}-d_{0.1})/d_{0.5}$ wherein $d_{0.1}$ represents a particle diameter (μm) of the particles whose ratio of particles equal to or less than it is 10%, $d_{0.9}$ represents a particle diameter of the particles whose ratio of particles equal to or smaller than it is 90% each in the particle diameter distribution.

By arranging the particle diameter distribution Span of the mother particle within the range of less than 5, the size of each particles become uniform each other and a uniform particle movement becomes possible.

Moreover, the average particle diameter $d_{0.5}$ of the mother particles is preferable to be 0.1 to 50 μm.

By designing the mother particles and the child particles as the foregoing, it is possible to improve stability at the time of repetition and at the time of storage, and driving voltage can be greatly reduced.

Although the reason why the improvement achieves is not clear, by disposing fine particles whose particle diameter is less than 20 times over the surface of the mother particles whose particle diameter distribution is uniform, it is supposed that the combined particles whose particle diameter is approximately uniform in macro concept, and the surfaces of the mother particles form fine rugged structure by the disposing the child particles in micro concept. Accordingly, it is considered that uniformity of particle diameter in macro concept contributes to repetition stability improvement in the particle movement, namely, at the time of durability and storage, and the fine rugged structure of the surfaces of the particles in micro concept contributes to adhesive force reduction with the substrate corresponding to the driving voltage reduction.

For this reason, it is important not to merely complex the mother particles and the child particles but to manage and design them within the previously described range. A method of complex the mother particles and the child particles may be a mechano-chemical method fixing the child particles by applying mechanical energy to drive them into the surfaces of the mother particles, a mechano-fusion method diffusing and fixing the child particles by applying thermal energy as well as mechanical energy to the surfaces of the mother particles, or a grafting method chemically coupling the child particles with the surface of the mother particles.

Besides, the preparation of the mother particles themselves or the child particles themselves may be kneading and crushing of necessary resin, electric charge control agent, coloring agent, and other additives; polymerizing from a monomer; or coating an existing particle with resin, electric charge control agent, coloring agent, or other additives.

Additionally, regarding with the child particles, they may be prepared from the above mentioned materials, however, it is preferable to just employ existing powders, for example, titanium oxide, zinc oxide, zinc sulfide, antimony oxide, calcium carbonate, white lead, talc, silica, calcium silicate, alumina white, a cadmium yellow, cadmium red, cadmium orange, titanium yellow, Berlin blue, sea blue, cobalt blue, cobalt green, cobalt violet, iron oxide, carbon black, manganese ferrite black, cobalt ferrite black, copper powders, and aluminum powders. Among these, titanium oxide, zinc oxide, or carbon black is particularly preferable.

Next, the foregoing requirement (12) describing that the ingredients for the particles for displaying images is obtained by surface treating fine particles with the use of solution of electric charge control agent will be described below:

As described above, there is a method of mixing electric charge control agent into the resin composing the surfaces of the particles (including coating resin) to assist the charge characteristic of the particles, however, the requirement (12) controls the charge characteristic of the ingredients for the particles for displaying images by surface treating the fine particles with the use of the solution of electric charge control agent.

The surface treatment is carried out by adding the fine particles into the solution made by dissolving electric charge control agent in a solvent, then separating the fine particles with filtration and drying them. By dissolving the electric charge control agent into the solvent, and by surface treating the fine particles with the solution, electric charge control agent will be fixed on the surfaces of the fine particles, charge control of the fine particles will become possible.

The fine particles as raw materials are polymerized from monomers in many cases because they are preferably spherical, however, they may be prepared by being coated with resin. Classification operation is optionally conducted to make the particle diameters uniform each other. Moreover, even besides it, crushing and classifying the resin may obtain the fine particles. With regard to the electric charge control agent, it is not specified as far as it is soluble in a solvent and charge control is possible, marketed material is preferably used. The same materials exemplified in the description regarding the requirement (1) are employable as these electric charge control agent.

Moreover, by selecting the electric charge control agent, dyeing to black or deep purple is possible simultaneously with charge control and the fine particles for black display are obtainable. Namely, dyeing of the fine particles is possible with the solution dissolving nigrosine compound, resin acid modified azine, resin acid modified azine compound, or metal-containing azo compound.

A solvent may be any in which the electric charge control agent is soluble without swelling and dissolution of the fine particles, and alcohol is preferably used as usual.

As for the processing method, adding around 0.1 to 10% of the electric charge control agent to the solvent and dissolving them by agitation with mixers are suitable. Then, removing the unsolved component by filtering the resultant solution, subsequently adding the fine particles in the filtration, and agitating the solution with mixers again are usual. The particles for displaying images should be obtained by taking out the processed fine particles from this mixture solution with the filtration, followed by drying with ovens.

Next, the foregoing requirement (13) describing that the ingredients for the particles for displaying images is coated with a resin by spraying a solution dissolving the resin will be detailed.

The requirement that they are coated with resin was already explained about the requirement (1). However, the requirement (13) means the preparation of a resin coating particles coated with a resin by spraying a solution dissolving the resin. In this method, a resin of low adhesion may be employed, and as for the particles made by this method, an adhesive force between particles or between the particles and the substrate can be reduced.

The particles (they are called as nuclear particles) to be coated may be normal particles as far as they have a desired color and are able to be coated, however, spherical particles with light specific gravity are particularly preferable.

Typical examples of the component of the particles to be coated are usually resins including urethane resin, urea resin, acryl acid resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acryl acid resin, polyolefin resin, butyral resin, vinylidene chloride resin, melamine resin, phenolic resin, fluorocarbon polymers, polycarbonate resin, polysulfon resin, polyether resin, and polyamide resin.

As the resin used for coating, material of low adhesion is preferable, and examples include urethane resin, acryl acid resin, polyester resin, urethane modified acryl acid resin, silicone resin, nylon resin, epoxy resin, melamine resin, phenol resin, and fluorocarbon polymers, and two kinds or more of these may be employed in combination.

Nylon resin, epoxy resin, styrene acrylic or acid resin is used preferably as a positive chargeable resin in particular, and fluorocarbon polymers, silicone resin, acrylic urethane or fluorocarbon polymers is preferably used as negative chargeable resin.

As for the coating amount of these resins it is preferable to be 0.01 to 30% by weight of the nuclear particles, more preferably 0.05 to 20% by weight, further more preferably 0.1 to 10% by weight. When the coating amount is less than 0.01% by weight, an effect of coating is not expected, when it exceeds 30% by weight, it becomes hard to reveal charge characteristic.

Further, electric charge control agent, coloring agent, or lubricant may be added optionally into the coating resin in order to assist charge characteristic or a color characteristic of the resin for coating the particle. The same materials exemplified in the description regarding the requirement (1) (they are coated with a resin) are employable as these electric charge control agent, coloring agent, and inorganic additive.

The particles with low adhesive force and free from aggregation will be obtained by spraying the solution prepared by dissolving the coating resin into water or organic solvent over the nuclear particles.

Concretely, at the beginning, coating resin is dissolved into water or organic solvent. In this occasion, it is a matter of course to use the material into which the coating resin is dissolvable as the solvent dissolving resin, however, materials whose boiling point is high are unfavorable because of its dry process in production, and methanol, ethanol, acetone, or 2-butanone may be used preferably.

In this manner, the prepared coating resin solution is sprayed over the nuclear particles. The spraying may be preferably carried out with the spraying nozzle having an appropriate diameter over nuclear particles included in a treatment container under the reduced pressure, however, it is not limited to this method.

The temperature inside the treatment container needs to be settled to the temperature sufficiently higher than the boiling point of the water or the organic solvent so that they will dry immediately. When the settled temperature is too low, the particle diameter will be too large, because the particles adhere and aggregate in the state that is not dry enough.

Besides, in order to prevent the particles from adhering and aggregating, the spraying is preferably carried out by the method of spraying the coating resin while agitating the particles intensely. As a method for agitating the particles, means to rotate an agitation blade inserted into the lower part of the treatment container is suggested. However, wire netting of #40 mesh may be employed as the bottom face of the treatment container and means to introduce compressed air of elevated temperature may be favorably conducted in parallel because the agitation of the particles becomes more intensive and the drying speed can be increased. Examples of such unit include Spira-Flow [produced by Freund Industries Co., Ltd] and Agglomaster [produced by Hosokawa Micron Co., Ltd.].

The average particle diameter of the resin coating particles is preferably 50 µm or smaller, and more preferably 1 to 30 µm. When the particle diameter is less than this range, charge density of the particles will be so large that an imaging force to an electrode and a substrate becomes too strong; resulting in poor following ability at the inversion of its electric field, although the memory characteristic is favorable. On the contrary, when the particle diameter exceeds this range, the following ability becomes rich and the memory characteristic degrades.

Moreover, defining the average particle diameter $d_{0.5}$ before coating resin as $r_a$ and defining the average particle diameter $d_{0.5}$ after coating resin as $r_b$, a changing factor $R=r_b/r_a$ is preferably 5 or smaller, and more preferably 3 or smaller.

The foregoing requirement (14) requires that the ingredients for the particles for displaying image is prepared by coating at least one resin layer formed as an outer layer over a spherical central component and the resin comprises a component whose index of refraction is different from that of the central component.

As thus described, by providing the particle structure of having at least one resin layer formed as an outer layer over a spherical central component and the resin comprises a component whose index of refraction is different from that of the central component, the light is diffused by a reflection in interface between the central particles, and the outer layer so that it appears as white. This corresponds to obtain image display particles which display white clearly with a low driving voltage, and the aim of realizing white particles only with resin was achieved.

Resins are usually employed as the spherical central component and typical examples include urethane resin, urea resin, acrylic resin, polyester resin, acryl urethane resin, acryl urethane silicone resin, acryl urethane fluorocarbon polymers, acrylic fluorocarbon polymers, silicone resin, acryl silicone resin, epoxy resin, polystyrene resin, styrene acrylic resin, polyolefin resin, butyral resin, vinylidene chloride resin, melamine resin, phenol resin, fluorocarbon polymers, polycarbonate resin, polysulfon resin, polyether resin, and amide resin.

The resin layer as the outer layer preferably contains the component polymerizing at least one kind of monomer selected from acrylic monomer, methacrylic monomer and styrenic monomer.

Typical examples of the component polymerizing at least one kind of monomer selected from acrylic monomer, methacrylic monomer and styrenic monomer include acrylic acid monomer, butyl acrylate monomer, methacrylic acid monomer, methachloronitrile monomer, methacrylic acid n-butyl monomer, methacrylic acid t-butyl monomer, methacrylic acid glycidyl monomer, methacrylic acid hydroxyethyl monomer, methacrylic acid 2-(dimethylamino) ethyl monomer, methacrylic acid 2-(diethylamino) ethyl monomer, styrene monomer, and methyl styrene monomer. By providing a resin layer polymerizing these monomers, the intended resin layer whose index of refraction is different from that of the central component will be obtained.

The foregoing requirement (15) requires that at least one kind of the ingredients for the particles for displaying images involves indefinite particles, around which at least one resin layer is formed by coating a resin comprising a component whose index of refraction is different from that of the indefinite particles.

As thus described, by preparing the particle structure involving indefinite particles, around which at least one resin layer is formed by coating a resin comprising a component whose index of refraction is different from that of the indefinite particle, thereby resulting in spherical particles as a whole, the incident light into the particles irregularly reflects on the interface with the indefinite particles. As a result, the light appears as white, and this corresponds to obtain image display particles which displays white clearly with a low driving voltage, and the aim of realizing white particles only with resin was achieved.

The indefinite particles may be usually obtained by crushing resins. The number of the indefinite particles involved in the particles for displaying image may be one or more.

The resin employable for the indefinite particles and for the outer layer is the same as the resin employable for the central component of the spherical particles and for the outer layer described in the previous explanation about the requirement (14).

The foregoing requirement (16) requires that the ingredients for the particles for displaying images contains a resin component prepared by polymerizing at least one kind of monomer selected from acrylic monomer, methacrylic monomer and styrenic monomer.

As thus described, by employing the resin component of radical polymerization type using acrylic monomer, methacrylic monomer, or styrenic monomer as the image display particles, characterization of positive or negative and ensuring the surface charge density becomes easy.

For example, in the case where resin particles of negative charge are required, polymerization with styrene as an essential component may be carried out. In the case where resin particles of positive charge are required, co-polymerization of acrylic monomer or methacrylic monomer with methacrylic acid 2-(diethylamino) ethyl, and so on may be carried out. As thus described, regulating the charge is possible by the selection and the blending ratio of the monomer.

When the surface charge density is poor only with the monomer, regulating the charge is possible easily by dissolving electric charge control agent into the monomer.

Typical examples of the acrylic monomer include acrylic acid monomer, methyl acrylate monomer, butyl acrylate monomer, and acrylonitrile monomer. Typical examples of the methacrylic monomer include methacrylic acid monomer, methyl methacrylate monomer, methacrylic acid n-butyl monomer, methacrylic acid t-butyl monomer, glycidyl methacrylate monomer, methacrylic acid hydroxyethyl monomer, metachloronitrile monomer, methacrylic acid 2-(diethylamino) ethyl monomer, and methacrylic acid 2-(dimethylamino) ethyl monomer. Examples of the styrenic monomer include styrene monomer and methyl styrene monomer. Moreover, two kinds or more of these monomers may be employable in combination.

By satisfying at least any one of above mentioned requirements (1) to (16), particles for displaying images superior in various characteristics such as display stability may be provided, however, in order to further improve display stability, it is effective to manage the stability, particularly the moisture content and a solvent-indissoluble ratio of the particle, that is, the resin composing the particles. The water absorption of the resin composing the particles is preferable to be 3% by mass or less, more preferable to be 2% by mass or less. Additionally, the water absorption is measured in accordance with ASTM D570 on the condition of the temperature of 23° C. for 24 hours.

Regarding the solvent-indissoluble ratio of the resin composing the particles, it is preferable that the solvent-indissoluble ratio expressed by the following equation is 50% or greater, particularly 70% or greater.

Solvent-indissoluble ratio (%)=$(B/A)\times 100$ wherein A represents the weight of said particles before it is immersed into the solvent, and B represents the weight of said particles after immersing it in a non-defective solvent for 24 hours at the temperature of 25° C.

When the solvent-indissoluble ratio is less than 50%, a bleed generate on the surface of the particles after a long-term storage, which may have an influence on the adhesive force with the particles causing some troubles in the movement of the particles with obstruction to the image display durability.

Additionally, favorable examples of the solvent for measuring the solvent-indissoluble ratio (non-defective solvent) include methyl ethyl ketone and so on for fluorocarbon polymers, methanol and so on for polyamide resin, methyl ethyl ketone, toluene or so for acrylic urethane resin, acetone, isopropanol or so for melamine resin, and toluene, etc. for silicone resin.

The particle is preferably spherical considering the relation with fluidity.

The average particle diameter $d_{0.5}$ is preferable to be 0.1 to 50 μm, particularly to be 1 to 30 μm. When the particle diameter is smaller than this range, charge density of the particle will be so large that imaging force to the electrode or the substrate may become too strong, resulting in poor following ability on an occasion of the electric field being inverted although the memory characteristic is favorable. On the contrary, when the particle diameter exceeds the range, the following ability is favorable, however, the memory characteristic will degrade.

As for the color of the particles, it is preferable to be white and/or black. However, in the case where the ingredients for the particles satisfy the foregoing requirement (14) or requirement (15), namely, when the particles comprises the center component and the outer layer (resin layer) with a different index of refraction, they will be white.

Although it is a matter of course that the charge amount of the particles depends upon the measurement condition, it is understood that the charge amount of the particles in the image display device almost depends upon initial charge amount and an attenuation accompanied by a contact with the substrate, a contact with other particles, or with an elapse of the time. It is also understood that a saturation value of charge behavior accompanying with the contact of the charged particles becomes the control factor. Inventors of the present invention measured the charge amount of the particles in accordance with the measuring method using a carrier in blow-off method, and it was found that the suitable charge amount of the particles for the image display device could be predicted by specifying the surface charge density calculated from the measured charge amount.

Measuring method will be described later, however, by means of blow-off method, bringing the particles into enough contact with the carrier particles and measuring the saturated charge amount enables to measure the charge amount per unit weight, and by pursuing both the the particle diameter and the specific gravity of the particles separately, it is possible to calculate the surface charge density of the particles.

In the image display device, because the particle diameter of the particles used is small and the influence of gravity is so small as can be ignored, specific gravity of the particles does not have influence to the movement of the particles. However, regarding the charge amount of the particles, even though the average charge amount per unit weight coincides about the particles with the same particle diameter each other, the charge amount to be held is different in 2 times in the case where the specific gravity of the particles is different in 2 times. Accordingly, it was found that the charge characteristic of the particles used for the image display device will be suitably evaluated by the surface charge density (unit: $\mu C/m^2$) without any relation with the specific gravity.

Here, it is not always preferable that the surface charge density is great. In the image display device with particle movement, it is preferable that the charge amount is few in order to move the particles in a low electric field (voltage) because when the particle diameter of the particles is large, there is the tendency that an electric imaging force corresponds to a factor mainly determining an electric field (voltage) to fly the particles. Further, when the particle diameter of the particles is small, it is preferable that the charge amount is much in order to move the particles in a low electric field (voltage) because non-electric force such as intermolecular force or liquid bridging force corresponds to the factor mainly determining the electric field (voltage) to fly the particles. In addition, because it depends upon the surface characteristics (materials, shape) of the particles greatly, it cannot be specified by merely the particle diameter and the charge amount unconditionally, however, when the surface charge density of the particles is appropriate, the particles work to move to the direction towards an electrode of different polarity by an electric field.

The inventors of the present invention found that by regulating the average particle diameter $d_{0.5}$ of the particles and the surface charge density within a specified range, the particles may become preferably usable particles for the image display device.

Namely, it is desirable that the average particle diameter of the particles $d_{0.5}$ is within the range of 0.1 to 50 μm and the surface charge density of the particles measured and calculated by blow-off method with the use of a carrier is within the range of 5 to 150 $\mu C/m^2$ as absolute value. When the absolute value of the surface charge density is less than this range, response speed to the change of an electric field will be late, and the memory characteristic degrades. When the absolute value of the surface charge density exceeds this range, image force for the electrode or the substrate will be so strong that the memory characteristic will be favorable, but following ability will be poor in the case where the electric field is inverted.

In the blow-off method, a mixture of the particles and the carriers are placed into a cylindrical container with nets at both ends, and high-pressure gas is blown from the one end to separate the particles and the carriers, and then only the particles are blew off from the mesh of the net. In this occasion, charge amount of reverse polarity remains on the carriers with the same charge amount of the particles carried away out of the container. Then, all of electric flux by this electric charge are collected to Faraday cage, and are charged across a capacitor with this amount. Accordingly, the charge amount of the particles is determined as $Q=C \cdot V$ (C: capacity, V: voltage across both ends of the capacitor) by measuring potential of both ends of the capacitor. And then, the surface charge density is determined from the value of this charge amount of the particles, the average particle diameter and the specific gravity of the particles each measured separately.

Because it is necessary for the particles to hold the charged electric charge, insulating particles with the volume specific resistance of $1 \times 10^{10}$ Ω·cm or greater are preferable, and in particular, insulating particles with the volume specific resistance of $1 \times 10^{12}$ Ω·cm or greater are more preferable.

Manufacture of the particles may be conducted, in the same manners as already explained, by kneading and crushing necessary resins, electric charge control agent, coloring agent, and other additives, by polymerizing from monomers, or by coating the existing particles with resins, electric charge control agent, coloring agent, and other additives.

In the case where a group of particles containing a mixture obtained by blending at least two kinds of the foregoing particles different in both color and charge characteristic are employed as the particles for displaying images, it is preferable that the surface charge density of each particle will be optimized mutually and the average particle diameter will be regulated within a specified range in order that each particle will ideally follow the inversion of the electric field.

As described above, the charge amount of the particles in the image display device almost depends upon initial charge amount and attenuation accompanied by a contact with the substrate, a contact with other particles, or with an elapse of the time; and a saturation value of charge behavior accompanying with the contact of the charged particles becomes the control factor, however, it is found that regulating the average particle diameter $d_{0.5}$ of the particles within a specified range enables to provide usable particles for the image display device.

Particularly in the case where the group of particles containing the mixture obtained by blending at least two kinds of the foregoing particles different in both color and charge characteristic are employed as the particles for displaying images, a saturation value of charge behavior in contact with the different particles of those kinds is an important control factor. Accordingly it is important to know the difference of the charge characteristic, in other words, work function between these two particles regarding charge amount. Inventors of the present invention found that when the difference of surface charge density are sufficient in the particles, two kinds of particles will hold charge amount of the different polarity by contacting each other and maintain a function of the movement caused by an electric field.

Namely, the flight of the particles will become capable of ideally following the application & inversion of the electric field by settling the average particle diameter $d_{0.5}$ within 0.1 to 50 μm and by settling that the difference of the surface charge density measured and calculated by the use of a carrier and in accordance with blow-off method is within the range of 5 to 150 $\mu C/m^2$ in an absolute value.

When the difference of the surface charge density of each particle is smaller than 5 $\mu C/m^2$, the area where the surface charge density distribution of these two kinds of particles overlap will increase. Under such situation, the two kinds of particles might not be ideally separated by an application of voltage, resulting in incapability of exhibiting sufficient performance as the display device.

Further, the absolute value of the surface charge density of either one of the two kinds of the particles is preferable to be within the range of 5 to 150 $\mu C/m^2$. In this occasion, the particles will ideally fly induced by an electric field so that other particles will be physically removed from the surface of the electrode, and as a result, it enables the display device to function sufficiently.

Similarly, in the case where the group of particles containing the mixture obtained by blending at least two kinds of the foregoing particles different in both color and charge characteristic are employed as the particles for displaying images, it is preferable to equalize the charge attenuation characteristic of each particle, thereby improving memory characteristic and repetition stability of each particle.

The charge attenuation characteristic of the particles is obtained by settling so that the surfaces of the particles are charged by a Corona generator caused by applying a voltage of 8 kV onto Corona generator deployed at a distance of 1 mm from the surface of each particle is 100 V or smaller, preferably 80 V or smaller at 0.3 second after the discharge.

Similarly, in the case where the group of particles containing the mixture obtained by blending at least two kinds of the foregoing particles different in both color and charge characteristic are employed as the particles for displaying images, it is preferable to make the average particle diameter of each particle close so that each particle can move towards each direction.

In other words, it is preferable that a ratio (A/B) between the maximum average particle diameter (A) of $d_{0.5}$ and the minimum average particle diameter (B) of $d_{0.5}$ is 50 or smaller regarding the two kinds or more of the particles of different color and charge characteristic.

The image display device of the present invention employs enclosing the foregoing particles for displaying images between the faced substrates at least one of which is transparent.

Figure 7:
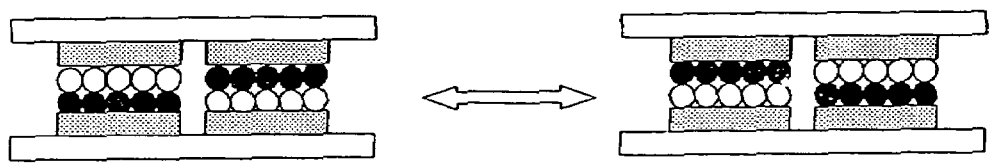
FIG. 7 is an illustration showing a displaying system in the image display device of the present invention.
Figure 8:
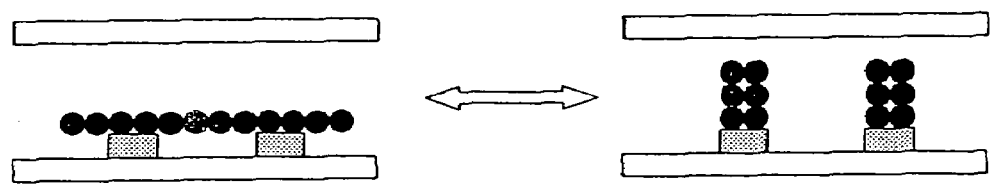
FIG. 8 is an illustration showing another displaying system in the image display device of the present invention.

As such a image display device, there is a displaying system wherein two kinds or more of the particles with different color are moved towards a vertical direction with the substrate as shown in FIG. 7, and there is another displaying system wherein the particles with one kind of color are moved towards a parallel direction with the substrate as shown in FIG. 8. The particles for displaying images of the present invention may be adopted to both displaying systems, however, it is desirable that the former system is adopted from the viewpoint of the stability.

Figure 9:
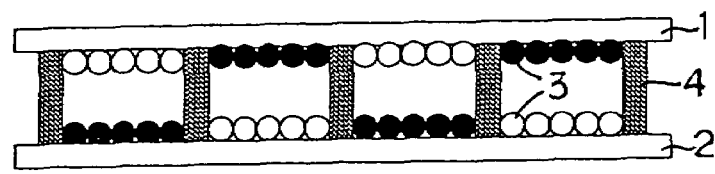
FIG. 9 is an illustration showing a structure of the image display device of the present invention.

FIG. 9 is an illustration to show one example of the structure of the image display device of the present invention. It is formed with substrate 1 and substrate 2 that are facing each other and particles 3, further partition wall 4 is installed if necessary.

Examples of the substrate material include polymer sheets such as polyethylene terephthalate, polyether sulfone, polyethylene, or polycarbonate, and inorganic sheets such as glass, quartz or so.

The thickness of the substrate is preferably 2 to 5000 μm, more preferably 5 to 1000 μm. When the thickness is too thin, it becomes difficult to maintain strength and distance uniformity between the substrates, and when the thickness is too thick, vividness and contrast as a display capability degrade, and in particular, flexibility in the case of using for an electron paper deteriorates.

Figure 2:
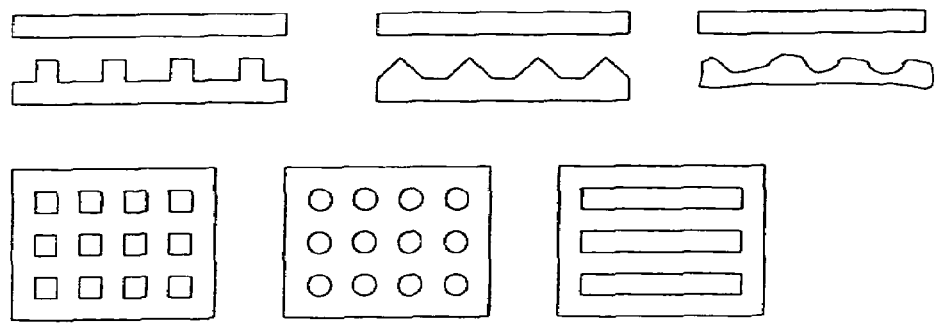
FIG. 2 is a figure showing an example of the shape of a substrate in the image display device of the present invention.

For the purpose of preventing unnecessary particle movement in the direction parallel to the substrates, a regular rugged structure may be applied by etching or so over the surface of the substrate. As shown in FIG. 2, examples from cross sectional direction of the substrate include triangle-shaped, square-shaped, and semicircular, and examples from substrate plane orientation include square-shaped, triangle-shaped, circular, and line shaped.

Although any area size and height of the rugged structure may be suitable, a part corresponding to the convex section (an area of a frame part) seen from the display side is preferable to be small, and by making the area of the frame part small, the vividness of image display elevates. Accordingly, by the convex part formation, durability repeatability and memory maintenance characteristics improve.

The distance between substrate 1 and substrate 2 is suitably adjusted in a manner where the particles can move and maintain the contrast of image display, however, it is adjusted usually within 10 to 5000 μm, preferably within 10 to 500 μm.

In the image display device, an electric field is formed between the substrates by the application of outside voltage input to electrodes. There are two cases of the electrode composition: establishing on the substrate and establishing on the other part being kept away from the substrate, for example, on both ends of the image display device, on the partition wall (described below), or on the outside surface of the substrate.

The electrode of this case is formed of electroconductive materials which are transparent and having pattern formation capability on a transparent substrate. Metals such as aluminum, silver, nickel, copper, and gold, or transparent electroconductive metal oxides such as ITO, electroconductive tin oxide, and electroconductive zinc oxide, or electroconductive polymer such as polyaniline, polypyrrole, and polythiophene all formed in the shape of thin film by sputtering method, vacuum vapor deposition method, CVD method, and coating method are used. Further, materials formed by applying mixed solution of the electroconductive material with a solvent and a synthetic resin binder over the substrate may be used.

The thickness of the electrode may be suitable unless the electroconductivity is absent or any obstacle exists in optical transparency, and it is preferable to be 3 to 1000 nm, more preferable to be 5 to 400 nm. The outside voltage input of this case may be direct current or superimposing alternating current.

Typical examples of the electroconductive material include cationic polyelectrolyte such as benzyltrimethylammonium chloride, tetrabutylammonium perchlorate, and so on, anionic polyelectrolyte such as polystyrenesulfonate, polyacrylate, and so on, or electroconductive fine powders of zinc oxide, tin oxide, or indium oxide. In addition, transparent electrode materials can be employed as the facing substrates, however, non-transparent electrode materials such as aluminum, silver, nickel, copper, and gold can be also employed.

It is preferable that an insulating coat layer is formed over each electrode in order not to leak the electric charge of the charged particles. It is particularly favorable that the coat layer employs resin of negative chargeability for positively charged particles and that the coat layer employs resin of positive chargeability for negatively charged particles, because the electric charge of the charged particles are hard to escape.

Outside application of the voltage to the electrode may be direct current or superposing alternating current.

Further, in the case where the electrode is not established on the substrate but established in the outside of the substrate separately with the substrate, an electrostatic latent image is formed over the outer surface of the substrate, and by making the predetermined charged particles with color drawn or repelled towards or from the substrate in an electric field that generates corresponding to the electrostatic latent image, the particles arranged correspondent with the electrostatic latent image are observed and recognized through the transparent substrate from outside of the image display device. Additionally, with regard to the formation of the electrostatic latent image, there are a transferring formation method wherein an electrostatic latent image formed by usual electronic photography system with the use of electronic photosensitive materials is transferred on the substrate of electrostatic image display device of the present invention, and a direct method wherein an electrostatic latent image is directly formed on the substrate by an ion-flow.

Figure 3:
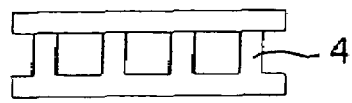
FIG. 3 is a figure showing other example of the shape of the substrate in the image display device of the present invention.
Figure 4:
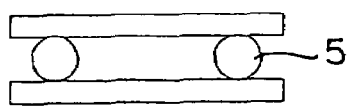
FIG. 4 is a figure also showing still other example of the shape of the substrate in the image display device of the present invention.

In the image display device of the present invention, durability repeatability and maintenance of memory characteristic may be improved by preventing unnecessary particle movement in a direction parallel with the substrate by means of subdividing the space between the substrates with the use of partition wall 4 as shown in FIG. 3, or spacer 5 as shown in FIG. 4. At the same time, the strength of the image display device itself will be elevated because the distance between substrates will become uniform and the substrates will be reinforced.

The volume population of the particle existing in the space between the faced substrates is preferable to be 10 to 80%, more preferable to be 10 to 60%. When the volume population exceeds 80%, it causes some troubles in the particle movement, and when it is less than 10%, contrast tends to be indistinct.

As described above, it is effective for display stability improvement to manage moisture content and solvent-indissoluble ratio of the particle, however, humidity management of gas in cavities surrounding the particles between the substrates also contributes to display stability improvement. Specifically, the humidity of gas in the cavities is 60% RH or less, preferably 50% RH or less, and more preferably 35% RH or less each at the temperature of 25° C.

The cavity means so-called gas environment where the particles contact and remained after subtracting an occupation part of particles 3, a device sealing portion and a partition wall and/or a spacer provided if necessary and which will be described below from the part sandwiched by substrate 1 and substrate 2 facing each other.

The kind of the gas is not specified so far as it satisfies the previously described humidity range, and suitable examples of the gas include dry air, nitrogen, argon, and helium.

Sealing the gas within the device in order to maintain the humidity is necessary. For example, assembling the particles, the substrate and so on that will be described below under a predetermined humidity environment, further providing a seal member and a seal method preventing humidity invasion from the outside to obtain the image display device wherein the gas and the particles are sealed.

In the image display device of the present invention, a partition wall locating between the faced substrates is optionally formed, and the display area may be formed of plural of display cells.

It is preferable to form the partition walls around each display element. The partition walls may be formed in two parallel directions. By this structure, unnecessary particle movement in the direction parallel with the substrate is prevented. Further, durability repeatability and memory holding characteristic are assisted. At the same time, the distance between the substrates is made uniform as reinforcing the strength of an image display panel.

The shape of the partition wall may be adaptively designed depending on the size of the particle related with the display, and although it is not particularly restricted, the width of the partition wall is 10 to 1000 µm, and preferably 30 to 500 µm, the height of the partition wall is 10 to 5000 µm, and preferably 10 to 500 µm.

On forming the partition wall, both ribs method joining both of the faced substrates after forming the ribs on them, and a single rib method forming the rib only on the substrate of one side are considered. However, for aiming to prevent a dislocation at the time of the joining, the partition wall formation by a single rib method is preferable. A gap may exist on the condition that the partition wall can prevent a traverse movement of the particle.

Figure 10:
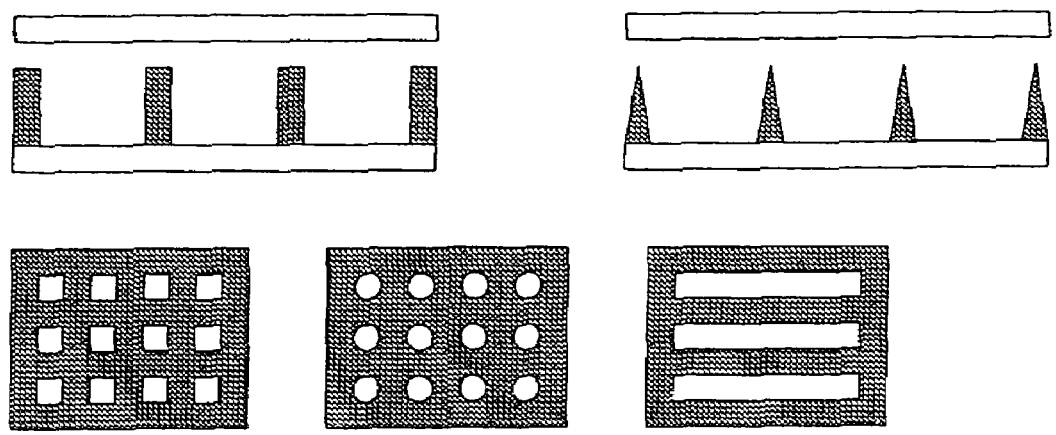
FIG. 10 is a figure showing an -example of the shape of a partition wall in the image display device of the present invention.

Display cells formed with the partition walls comprising of those ribs are, as shown in FIG. 10, square-shaped, triangle-shaped, line-shaped, or circular viewing from the direction of substrate plane.

The part corresponding to the sectional portion of the partition wall (an area of a frame part of the display cell) seen from the display side is preferably as small as possible, so that the vividness of image display increases. The formation method of the partition wall is not particularly restricted, however, a screen printing method wherein pastes are overlapped by coating repeatedly on a predetermined position by screen plate; a sandblast method wherein partition materials are painted with a desired thickness entirely over the substrate and then after coating resist pattern on the partition materials which is wanted to be left as a partition, jetting abrasive to cut and remove partition materials aside from the partition part; lift-off method (additive method) wherein a resist pattern is formed on the substrate using photopolymer, and then after burying paste into a resist recess, removing the resist; photosensitive paste method wherein the photosensitive resin composition containing the partition materials is applied over the substrate and then obtaining a desired pattern by exposure & developing; and mold formation method wherein paste containing the partition materials is applied over the substrate and then forming a partition by compression bonding & pressure forming the dies having rugged structure; and so on are adopted. Further, modifying the mold formation method, relief embossing method wherein a relief pattern provided by a photopolymer composition is used as a mold is also adopted.

Figure 11:
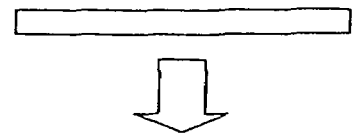
FIG. 11 is an illustration of a process for forming a partition wall by screen-printing method in the image display device of the present invention.
Figure 11:
Figure 11:
Figure 11:
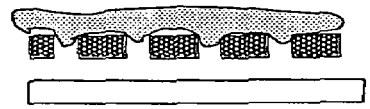
Figure 11:
Figure 11:
Figure 11:
Figure 11:
Figure 11:
Figure 11:
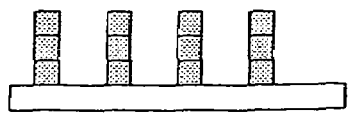

Typical example of a concrete process of the screen printing method comprises, as illustrated in FIG. 11, the following steps:

(1) Preparing paste as the partition material.

(2) Preparing printing plate for printing a partition pattern comprising stainless mesh, polyester mesh, etc.

(3) Applying and transferring the paste over one surface of the substrate by means of the printing plate (if necessary, over the substrate where the previously described electrode pattern is formed).

(4) Curing by application of heat.

(5) Repeating the steps (3) to (4) until the thickness of the cured paste reaches a predetermined value (equivalent to the designed height of the partition wall), and forming desired partition shape.

In this occasion, the printing plate may comprise any meshes capable of printing predetermined partition pattern, and examples include a plated mesh processed to secure high tension, metal mesh such as high-tensile material mesh, chemical fiber mesh such as polyester mesh, Tetoron mesh, or the combination type mesh adhering polyester mesh between a plate frame and print areas.

Regarding the screen printing, a usual screen printing machine can be used, and the paste is transferred by means of the foregoing printing plate over the substrate with the use of squeegee and scraper.

In this case, the attack angle of the squeegee is 10 to 30 degrees, and preferably 15 to 25 degrees. The squeegee speed is 5 to 500 mm/sec and preferably 20 to 100 mm/sec. The squeegee printing pressure is 0.1 to 10 kg/cm$^2$, preferably 0.5 to 3 kg/cm$^2$.

Figure 12:
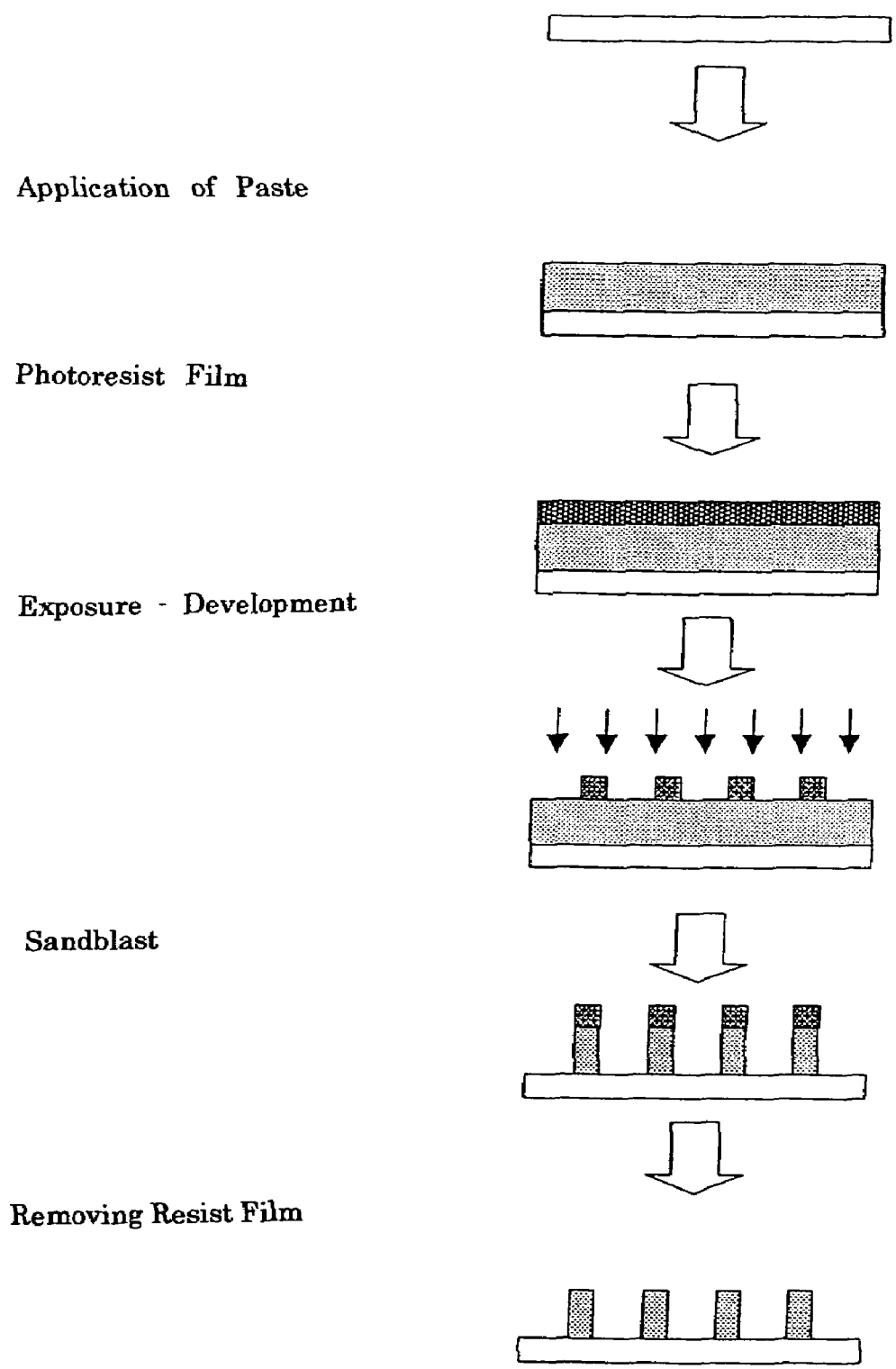
FIG. 12 is an illustration of a process for forming a partition wall by sandblast method in the image display device of the present invention.

Typical example of a concrete process of the sandblast method comprises, as illustrated in FIG. 12, the following steps:

(1) Preparing paste as the partition material.

(2) Applying the paste over one surface of the substrate (if necessary, over the substrate where the previously described electrode pattern is formed) and drying to cure the paste.

(3) Adhering a dry film photo resist thereupon.
(4) Leaving only a pattern part to be the partition by exposure and etching.
(5) Etching the pattern part where the resist was removed by sandblasting until a predetermined lib shape is obtained.

In addition, taking care about securing rectilinear propagation of abrasives jetted from a sandblast nozzle of the sandblast apparatus by adjusting the balance between air pressure on the abrasives and ejection amount of the abrasives is important on the occasion of sandblasting. This makes final shape of the formed partition wall beautiful, and side edges of the partition wall particularly decreases because extra diffusion of abrasives reduces.

Further, examples of the abrasives used for sandblast include glass beads, talc, calcium carbonate, and metal powders.

Figure 13:
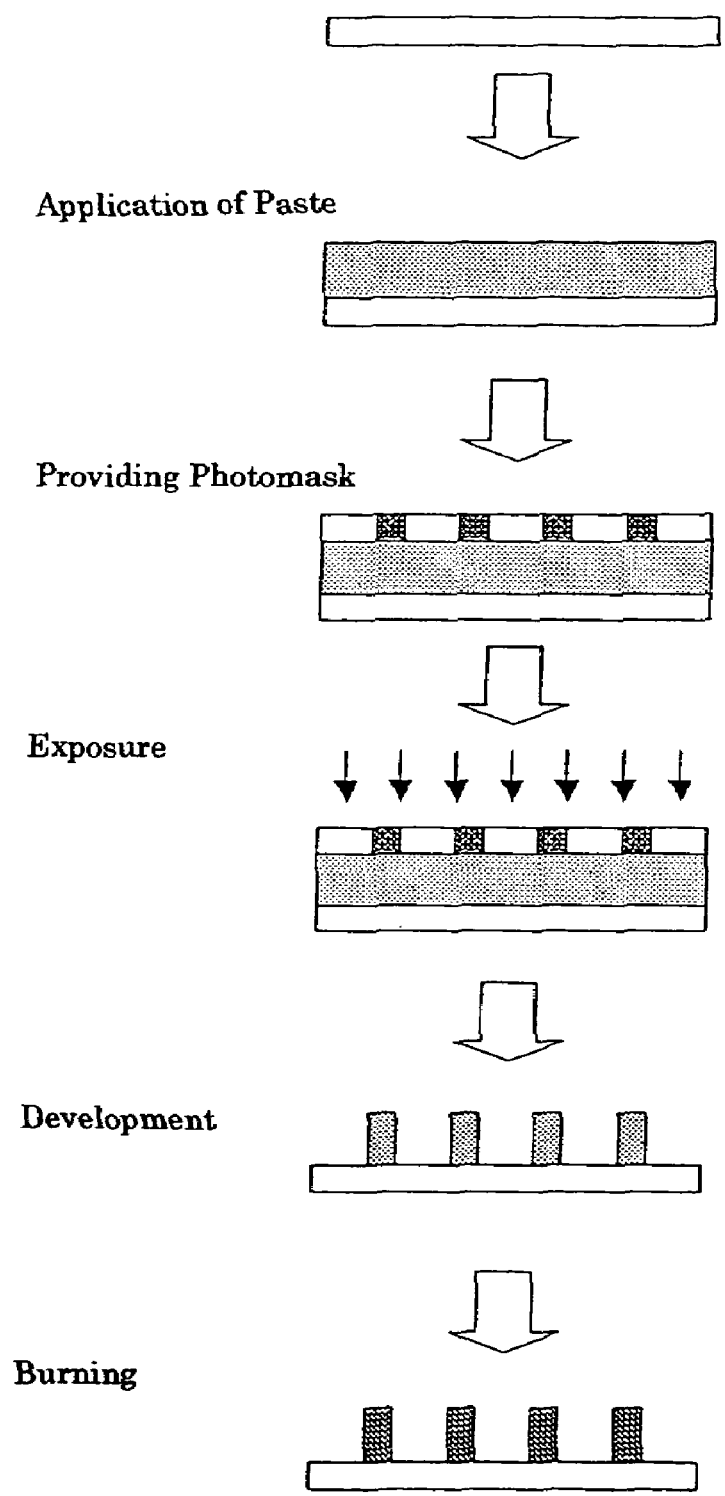
FIG. 13 is an illustration of a process for forming a partition wall by photosensitive paste method in the image display device of the present invention.

Typical example of a concrete process of the photosensitive paste method comprises, as illustrated in FIG. 13, the following steps:
(1) Preparing photosensitive paste containing photopolymer.
(2) Applying the photosensitive paste over one surface of the substrate (if necessary, over the substrate where the previously described electrode pattern is formed).
(3) Exposing only a pattern part to be the partition by means of a photo-mask, and curing the photosensitive paste. (Optionally repeating the steps (2) to (3) until the height of the cured paste reaches a desired value)
(4) Developing and removing an uncured part.
(5) Burning the cured part if necessary.

Additionally, the photosensitive paste essentially comprises inorganic powders, photopolymer, and light-initiator, and further comprises solvent, resin, and additives.

Figure 14:
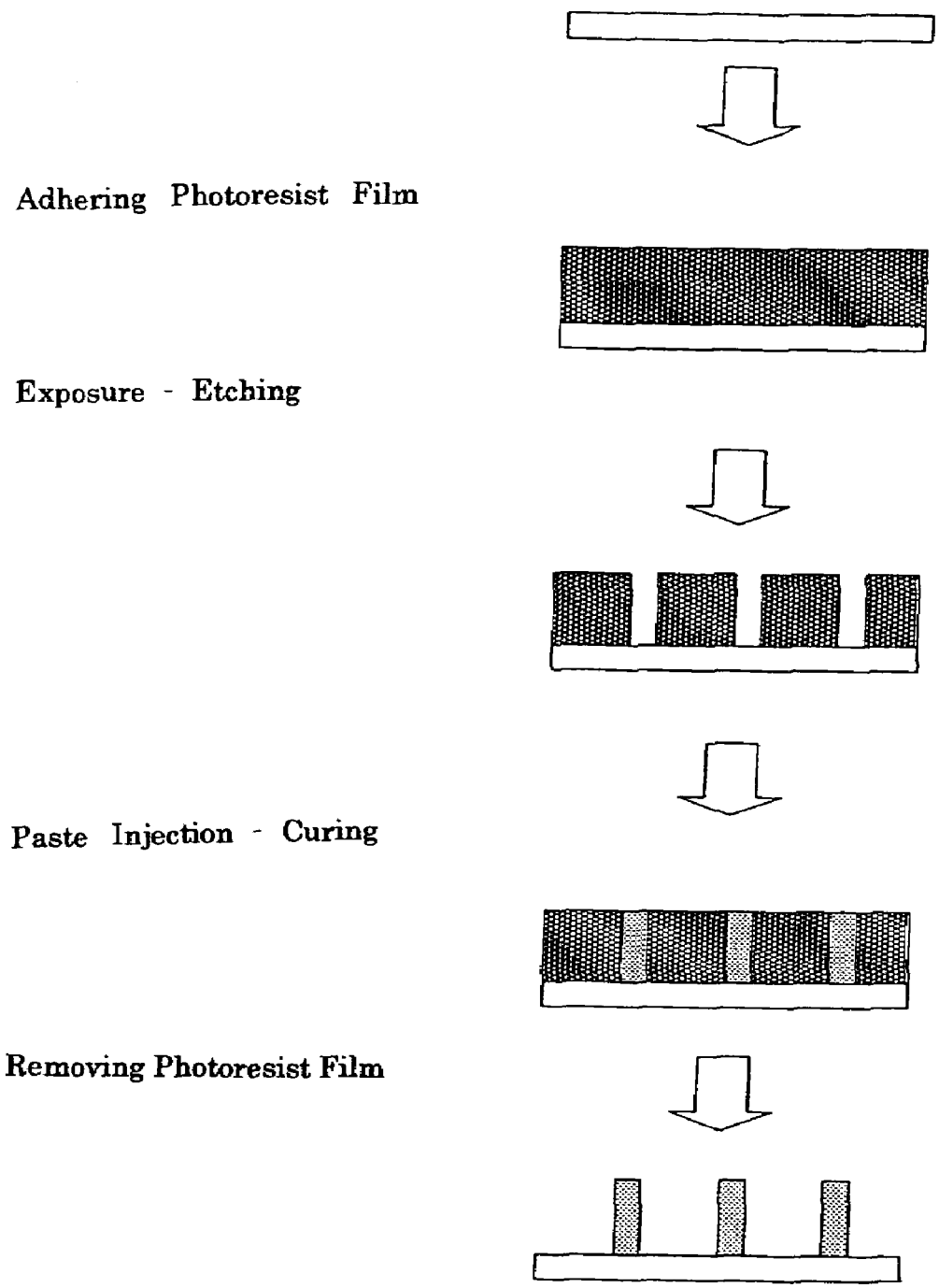
FIG. 14 is an illustration of a process for forming a partition wall by additive method in the image display device of the present invention.

Typical example of a concrete process of the additive method comprises, as illustrated in FIG. 14, the following steps:
(1) Adhering a photoresist film on the substrate.
(2) Leaving the photoresist film only on the part between the partitions to be formed by exposure etching.
(3) Preparing paste as the partition material and curing.
(4) Removing the photoresist film and forming a predetermined partition shape.

The paste as the partitions material essentially comprises inorganic powders and resin and further comprises solvent and additives. Examples of the inorganic powders include ceramic powders and glass powders, and these may be used alone or in combination of two or more kinds thereof.

Typical examples of the ceramic powders include oxide ceramics such as $ZrO_2$, $Al_2O_3$, CuO, MgO, $TiO_2$, and $ZnO_2$, and non-oxide ceramics such as SiC, AlN, and $Si_3O_4$.

Typical examples of the glass powders include the materials obtained by melting, cooling, and crushing $SiO_2$, $Al_2O_3$, $B_2O_3$, and ZnO as ingredients. In addition, glass transition temperature Tg of the glass powders is preferably 300 to 500° C. because this temperature range enables the burning process at low temperature with a merit of causing little damage.

In this occasion, it is suitable that the particle diameter distribution Span of the inorganic powders for the paste as partition material expressed by the foregoing equation is 8 or smaller, preferably 5 or smaller.

By making the Span smaller than 8, size of the inorganic powders in the pasted will be uniform and a precise partition wall formation will be possible even though the foregoing steps from applying to curing the above-mentioned paste is repeated to lamination.

Further, the average particle diameter $d_{0.5}$ of the inorganic powders in the paste is 0.1 to 20 μm, and preferably 0.3 to 10 μm. By regulating them within the range, precise partition wall formation will be possible under the previous repeated lamination in a similar manner.

Additionally, these particle diameter distribution and particle diameter are determined in accordance with the foregoing description.

Any resin capable of containing previously described inorganic powders and forming predetermined partition shape may be employed as the resin contained in the paste for partitions, and examples include thermoplastic resin, thermosetting resin, and reactive resin. In consideration of the required partition properties, the molecular weight and the glass transition temperature of the resin should be as large as possible. Typical examples of the resin include acrylic, styrenic, epoxy-based, phenolic, urethane-based, polyester-based, and urea-based, preferably in particular, acrylic, epoxy-based, urethane-based, and polyester-based.

Any solvent to be added into the paste for partitions compatible with the inorganic powders and with the resin may be employed, and examples include aromatic solvent such as phthalic acid ester, toluene, xylene, and benzene; alcoholic solvent such as oxyalcohol, hexanol, and octanol; ester-based solvent such as ester acetate. They are usually added into the paste in an amount of 0.1 to 50 parts by weight to the inorganic powders.

Dye, polymerization inhibitor, plasticizer, thickener, dispersion agent, antioxidant, hardening agent, hardening accelerator, or sedimentation inhibitor may be added optionally to the paste.

The paste materials comprising of these is dispersedly blended with kneaders, agitators, or three rollers under a desired prescription. Considering workability, it is favorable that the viscosity is 500 to 300000 cps.

In the image display device of the present invention, a method for charging the particles negatively or positively is not specified particularly, however, Corona discharge method, electrode injection method, and friction method is used

EXAMPLES

The present invention will be described in further detail with reference to Examples and Comparative Examples, which do not limit the scope of the present invention.

Further, the evaluation about particles and the image display device in Examples and Comparative Examples obtained in Examples and Comparative Examples were carried out in accordance with the following criteria. Additionally, "an average particle diameter" means "$d_{0.5}$" in the following description.

(1) Surface Potential

With the use of 2000CRT instrument produced by in QEA Co., Ltd., applying the voltage of 8 KV to Corona generator disposed with a distance of 1 mm to the surface to generate the Corona discharge, and charging the surface, and then, surface potential after 0.3 seconds was measured. In addition, the measurement environment was settled to the temperature of 25° C., and the humidity of 55% RH.

(2-1) Coating Amount of Resin −1

With the use of TGA instrument, rising the temperature up to 800° C. with a rising rate of 20° C./min, the coating amount of the resin over the particles coated with the resin was calculated from the weight change.

(2-2) Coating Amount of Resin −2

With the use of DSC instrument, rising the temperature up to 800° C. with a rising rate of 20° C./min, the coating amount of the resin over the particles coated with the resin was calculated from the peak area ratio.

(3) Solvent-Indissoluble Ratio

After immersing each particles into methyl ethyl ketone solvent at the temperature of 25° C. for 24 hours, they were dried at the temperature of 100° C. for 5 hours, and then, the weight was measured. With the use of TGA instrument, the weight change of before and after immersing was measured and the solvent-indissoluble ratio was calculated by the following equation:

Solvent-indissoluble ratio (%)=($B/A$)×100 wherein A represents the weight of said particles before it is immersed into the solvent, and B represents the weight of said particles after immersing it in a non-defective solvent for 24 hours at the temperature of 25° C.

(4-1) Evaluation of Display Capability −1

A voltage of 250 V was applied on the assembled image display device, and while inverting the polarity; displays of black & yellow were repeated.

The evaluation of the display capability was conducted by measuring about the contrast ratio, at the first stage, after repeating 10000 times, and after leaving 5 days with the use of a reflection image density instrument (RD918 produced by Macbeth Co., Ltd, the same below). In this occasion, the contrast ratio is a ratio between reflection density at the time of black display/reflection density at the time of yellow display. In addition, the ratio between the contrast ratio at the first stage and the contrast ratio after repeating 1000 times (or 10000 times), or the contrast ratio of after leaving 5 days was determined as contrast retention.

(4-2) Evaluation of Display Capability −2

A voltage of 250 V was applied on the assembled image display device, and while inverting the polarity; displays of black & yellow were repeated.

The evaluation of the display capability was conducted by measuring about the contrast ratio, at the first stage, after repeating 1000 times, and after leaving 5 days with the use of a reflection image density instrument (RD918 produced by Macbeth Co., Ltd, the same below). In this occasion, the contrast ratio is a ratio between reflection density at the time of black display/reflection density at the time of yellow display. In addition, the ratio between the contrast ratio at the first stage and the contrast ratio after repeating 1000 times, or the contrast ratio of after leaving 5 days was determined as contrast retention.

(4-3) Evaluation of Display Capability −3

A voltage of 250 V was applied on the assembled image display device, and while inverting the polarity; displays of black & white were repeated 10 times and then, a reflection density at the time of displaying black was measured.

Subsequently, in order to confirm the retention, reflection density was measured again after leaving 10 days under the condition of stopping application of a voltage. Moreover, a voltage of 250 V was applied again, and while inverting the polarity, whether the display of black & white shows any abnormality or not was confirmed.

(4-4) Evaluation of Display Capability −4

A voltage of 250 V was applied on the assembled image display device, and while inverting the polarity; displays of black & white were repeated.

Evaluation of display capability was conducted by measuring the contrast ratio with the use of a reflection image density instrument. In this occasion, the contrast ratio is a ratio between reflection density at the time of black display/reflection density at the time of white display. Moreover, leaving the image display device at the temperature of 0° C., 25° C., and 60° C., the contrast ratio at each temperature were measured respectively.

(4-5) Evaluation of Display Capability −5

A voltage of 250 V was applied on the assembled image display device, and while inverting the polarity; displays of black & white were repeated.

Evaluation of display capability was conducted by measuring the contrast ratio at the first stage, and after repeating 10000 times, with the use of a reflection image density instrument. In this occasion, the contrast ratio is a ratio between reflection density at the time of black display/reflection density at the time of white display. In addition, the ratio between the contrast ratio at the first stage and the contrast ratio after repeating 10000 times was determined as retention.

(4-6) Evaluation of Display Capability −6

Figure 15:
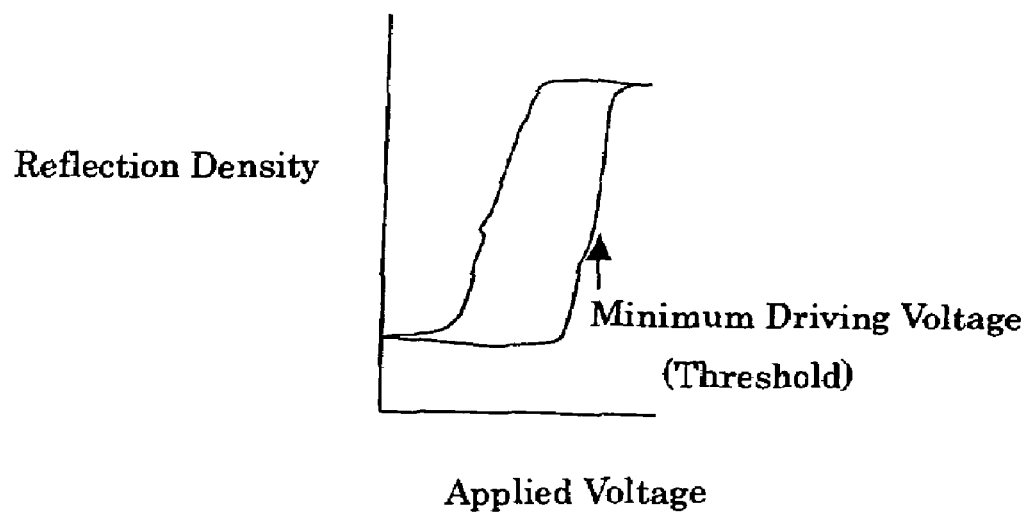
FIG. 15 is an illustration showing a measuring method of the minimum driving voltage in EXAMPLE.

Raising the applied voltage on the assembled image display device gradually, the voltage enabling to start movement of the particle was measured as the minimum driving voltage. As shown in FIG. 15 as a specific example, the voltage as the threshold in the relation of the applied voltage and reflection density was determined as the minimum driving voltage.

Next, a voltage of the minimum driving voltage plus 10V was applied, and while inverting polarity, displays of black & white was repeated.

The evaluation of the display capability was conducted by measuring about the contrast ratio, at the first stage, after repeating 10000 times, and after leaving 5 days with the use of a reflection image density instrument. In this occasion, the contrast ratio is a ratio between reflection density at the time of black display/reflection density at the time of white display. In addition, the ratio between the contrast ratio at the first stage and the contrast ratio after repeating 10000 times or after leaving 5 days was determined as retention.

(4-7) Evaluation of Display Capability −7

A voltage of 500 V was applied on the assembled image display device, and while inverting the polarity; displays of black & white were repeated.

The evaluation of the display capability was conducted by measuring about the contrast ratio, at the first stage, after repeating 10000 times, and after leaving 5 days with the use of a reflection image density instrument. In this occasion, the contrast ratio is a ratio between reflection density at the time of black display/reflection density at the time of white display. In addition, the ratio between the contrast ratio at the first stage and the contrast ratio after repeating 10000 times or after leaving 5 days was determined as retention.

(4-8) Evaluation of Display Capability −8

A voltage of 500 V was applied on the assembled image display device, and while inverting the polarity; displays of black & white were repeated.

The evaluation of the display capability was conducted by measuring about the contrast ratio, at the first stage, after repeating 10000 times, and after leaving 5 days with the use of a reflection image density instrument. In this occasion, the contrast ratio is a ratio between reflection density at the time of black display/reflection density at the time of white display.

Furthermore, unevenness at the time of full-scale display was evaluated in accordance with the following standards.

A: Entire surface of about 100% renders coloration of black & white.

B: White slightly mixes in black display or vice versa.

C: Black & white considerably mix in the display.

(5) Particle Diameter and Span of Particle Diameter Distribution

Each group of particles was cast into Mastersizer 2000 (brand name, produced by Malvern instruments Ltd.) measuring instrument, and by means of attached software (software to calculate particle diameter distribution and particle diameter based on volume standard distribution), the following value was obtained:

$$\text{Span}=(d_{0.9}-d_{0.1})/d_{0.5}$$

wherein $d_{0.1}$ represents a particle diameter (μm) of the particles whose ratio of particles equal to or less than it is 10%, $d_{0.5}$ represents a particle diameter (μm) defining that 50% of the particles are greater than this, and another 50% of the particles are smaller than this, $d_{0.9}$ represents a particle diameter of the particles whose ratio of particles equal to or smaller than it is 90% each in the particle diameter distribution.

(6) Surface Hardness

The surface hardness of the particles was measured with the use of a durometer by the unit of D scale in accordance with JIS K7215.

(7) Water Absorption

The water absorption of the particle was measured under the measuring condition at the temperature of 23° C. for 24 hours in accordance with ASTM D570.

(8) Tensile Break Strength

The tensile break strength of the particles was measured in accordance with JIS K7113.

(9) Izod Impact Strength

The Izod impact strength of the particles was measured at the temperature of 23° C. in accordance with ASTM D256.

(10) Abrasion Loss (Taber)

The abrasion loss (Taber) of the particles was measured under the condition of under the condition of load 9.8 N for 1000 times in accordance with JIS K7204.

(11) Tensile Elastic Modulus

The tensile elastic modulus of the particles was measured in accordance with JIS-K7113.

(12) Flexural Elastic Modulus

The flexural elastic modulus of the particles was measured in accordance with ASTM-D790.

(13) Tear Strength

The tear strength of the resin was measured in accordance with ASTM-D624 about the sample with the thickness of 2 mm.

(14) Average Particle Diameter $d_{0.5}$

The average particle diameter $d_{0.5}$ of the particles was measured in accordance with the method described regarding the foregoing requirement (5).

(15) Changing Factor of the Particle Diameter

Coating the particles with a resin and measuring the average particle diameter $d_{0.5}$ before coating resin as $r_a$ and measuring the average particle diameter $d_{0.5}$ after coating resin as $r_b$, a changing factor: $R=r_b/r_a$ was obtained, wherein $d_{0.5}$ represents a particle diameter (μm) defining that 50% of the particles are greater than this, and another 50% of the particles are smaller than this.

(16) Surface Charge Density

As a blow-off powder charge amount measuring instrument, TB-200 produced by Toshiba Chemical Co., Ltd. was used. Two kinds of positive and negative charging resin were employed as the carriers, and charge density per unit area (unit: $\mu C/m^2$) was measured in each case. Namely, F963-2535 available from Powder TEC Co., Ltd. was employed as a positive charging carrier (the carrier whose opponent is positively charged and itself tends to be negative) and F921-2535 available from Powder TEC Co., Ltd. was employed as negative charging carrier (the carrier whose opponent is negatively charged and itself tends to be positive).

The surface charge density of the particles was obtained from the measured charge amount, the average particle diameter and specific gravity of the particles measured separately. In addition, the average particle diameter was measured by the foregoing method, and the specific gravity was measured with the use of a hydrometer produced by Shimadzu Seisakusho Ltd. (brand name: Multi Volume Density Meter H1305).

Example A1

Particles A were prepared by selecting black polymerization toner for electrophotography (spherical particles with particle diameter of 8 μm) as particles to be coated, and also selecting acryl urethane resin EAU65B (available from Asia-kogyo Co., Ltd.)/IPDI series crosslinking agent Excel-Hardner HX (available from Asia-kogyo Co., Ltd.) as the resin for coating the particles beforehand. Additionally, the ratio between EAU65B25 and Excel-Hardner HX was adjusted to be 6:4 expressed as solid content weight ratio for the use.

The particles A coated with resin beforehand were prepared by blowing the solution provided by dissolving the above-mentioned acryl urethane resin and crosslinking agent in methylethylketone (MEK) solvent in a misty way as the coating method, into Spira-Flow apparatus (produced by Freund Industries Co., Ltd.), and in the state that the particles to be coated were flowing, the resin was applied over the surface of the particles, followed by warming.

Particles B were prepared by selecting yellow polymerization toner (spherical particles with particle diameter of 7 μm) for electrophotography as particles to be coated, and also selecting fluorocarbon polymers-based resin Kyner2751 (available from Elphatochem Co., Ltd.) as the resin for coating the particles beforehand.

The particles B coated with resin beforehand were prepared similarly as the particles A by blowing the solution provided by dissolving the above-mentioned fluorocarbon polymers-based resin Kyner2751 in MEK solvent in a misty way as the coating method, into Spira-Flow apparatus (produced by Freund Industries Co., Ltd.), and in the state that the particles to be coated were flowing, the resin was applied over the surface of the particles, followed by warming.

The display device was assembled as follows: Namely, between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of particles A and particles B was determined to the same weight each other respectively and the filling factor of these particles between the glasses substrates was adjusted to 60% by volume.

The evaluation results about the characteristics of the particles and the display capability are shown in Table A.

Example A2

The display device was assembled similarly as Example A1 except that the resin for coating the particles A was replaced to nylon resin TORESIN EF300 (available from Teikoku Chemical Industry Co., Ltd.) in Example A2.

The evaluation results about the characteristics of the particles and the display capability are shown in Table A.

Example A3

The display device was assembled similarly as Example A1 except that 2 phr of charge control agent BONTRON P51 (available from Orient Chemical Co., Ltd.) was added to the resin for coating the particles A in Example A3.

The evaluation results about the characteristics of the particles and the display capability are shown in Table A. Because the charge control agent was added, the contrast turned better a little.

Example A4

The display device was assembled similarly as Example A1 except that the spraying condition of coating was arranged and the amount of the coating resin was increased in the preparation of the particles A.

The evaluation results about the characteristics of the particles and the display capability are shown in Table A. Because the amount of the coating resin was increased, the durability (retention factor) decreased a little.

Example A5

The display device was assembled similarly as Example A1 except that the resin for coating the particles A was replaced to the mixture of epoxy resin AER6071 (available from Asahi Chemical Industry Co., Ltd.) and hardening agent Sumicure M (available from Sumitomo Chemical Co., Ltd.) with the mixing ratio of 7:2 in Example A5.

The evaluation results about the characteristics of the particles and the display capability are shown in Table A.

Example A6

The display device was assembled similarly as Example A1 except that the resin for coating the particles A was only acryl urethane resin EAU65B (available from Asia-kogyo Co., Ltd.) in Example A6.

The evaluation results about the characteristics of the particles and the display capability are shown in Table A. Because the crosslinking agent was not used, extravagant degradation in preservation was found.

Comparative Example A1

The display device was assembled similarly as Example A1 except that both the particles A and the particles B were used bare without coating resin in Comparative Example A1.

The evaluation results about the characteristics of the particles and the display capability are shown in Table A. Both the contrast ratio and the durability (retention) were poor.

Example B1

Black polymerization toner for electrophotography (spherical particles with particle diameter of 7 μm) were employed as the particles A.

The display device was assembled as follows: Namely, between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. The evaluation results are shown in Table B.

Example B2

The display device was assembled similarly as Example B1 except that the particles A were replaced to black ground toner for electrophotography (ground classification type with particle diameter of 9 μm) in Example B2. The evaluation results are shown in Table B.

Example B3

The display device was assembled similarly as Example B1 except that the particles A were replaced to carbon microbeads PC (available from Nippon Carbon Co., Ltd.) in Example B3. The evaluation results are shown in Table B.

Example B4

The display device was assembled similarly as Example B1 except that the particles A were prepared as the following: As for particles A, 4 phr of carbon black (CB) and 2 phr of BONTRON N07 (available from Orient Chemical Co., Ltd.) as charge control agent were added into epoxy-based resin AER6071 (available from Asahi Chemical Industry Co., Ltd.; without addition of crooss linking agent), and after kneading with the use of dual-shaft extruder, the mixture was crushed with Jetmill and classified into particles. The evaluation results are shown in Table B.

Because they were without addition of crooss linking agent, the solvent-indissoluble ratio of the particles A in the solvent was small and extravagant degradation in storage was found.

Example B5

The display device was assembled similarly as Example B1 except that the particles A were replaced to carbon microbeads MSB (available from Nippon Carbon Co., Ltd.) in Example B5. The evaluation results are shown in Table B.

Comparative Example B1

The display device was assembled similarly as Example B1 except that the particles A were replaced to carbon microbeads ISB (available from Nippon Carbon Co., Ltd.) in Comparative Example B1. The evaluation results are shown in Table B.

Example C1

As for particles A, 4 phr of carbon black (CB) and 2 phr of BONTRON N07 (available from Orient Chemical Co., Ltd.) as charge control agent were added into acryl urethane resin EAU206B (available from Asia-kogyo Co., Ltd.) and isophorone-di-isocianate (IPDI)-based crosslinking agent Excel-Hardner HX (available from Asia-kogyo Co., Ltd.), and after kneading, the mixture was crushed with Jetmill and classified into particles.

As for particles B, 10 phr of titanium oxide and 2 phr of BONTRON E89 (available from Orient Chemical Co., Ltd.) as charge control agent were added into acryl urethane resin EAU206B (available from Asia-kogyo Co., Ltd.) and IPDI-based crosslinking agent Excel-Hardner HX (available from Asia-kogyo Co., Ltd.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. The evaluation results are shown in Table C. There was no extraordinary phenomenon in shelf life.

Example C2

The display device was assembled similarly as Example D1 except that the resin composing the particles A and the particles B was replaced to acryl urethane resin EAU205B (available from Asia-kogyo Co., Ltd.) and IPDI-based crosslinking agent Excel-Hardner HX (available from Asia-kogyo Co., Ltd.) in Example C2. The evaluation results are shown in Table C. There was no extraordinary phenomenon in shelf life.

Example C3

The display device was assembled similarly as Example C1 except that the resin composing the particles A and the particles B was replaced to acryl urethane resin EAU205B (available from Asia-kogyo Co., Ltd.) in Example C3. The evaluation results are shown in Table C. Because the crosslinking agent was not used, degradation in storage was found.

Comparative Example C1

The display device was assembled similarly as Example C1 except that the resin composing the particles A and the particles B was replaced to acryl urethane resin EAU188B (available from Asia-kogyo Co., Ltd.) and IPDI-based crosslinking agent Excel-Hardner HX (available from Asia-kogyo Co., Ltd.) in Comparative Example C1. The evaluation results are shown in Table C. There was no extraordinary phenomenon in shelf life.

Example D1

As for particles A, 4 parts by mass (phr) of carbon black (CB) and 2 parts by mass (phr) of BONTRON N07 (available from Orient Chemical Co., Ltd.) as charge control agent were added into acrylurethane resin EAU204B (available from Asia-kogyo Co., Ltd.) and isophorone-di-isocianate (IPDI)-based crosslinking agent Excel-Hardner HX (available from Asia Kogyo Co., Ltd.), and after kneading, the mixture was crushed with Jetmill and classified into particles.

As for particles B, 10 phr of titanium oxide and 2 phr of BONTRON E89 (available from Orient Chemical Co., Ltd.) as charge control agent were added into acrylurethane resin EAU204B (available from Asia-kogyo Co., Ltd.) and IPDI-based crosslinking agent Excel-Hardner HX (available from Asia-kogyo Co., Ltd.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glass substrates was adjusted to 60% by volume. The evaluation results are shown in Table D. There was no extraordinary phenomenon in shelf life.

Example D2

The display device was assembled similarly as Example D1 except that the resin composing the particles A and the particles B was replaced to acryl urethane resin EAU203B (available from Asia-kogyo Co., Ltd.) and IPDI-based crosslinking agent Excel-Hardner HX (available from Asia-kogyo Co., Ltd.) in Example D2. The evaluation results are shown in Table D. There was no extraordinary phenomenon in shelf life.

Example D3

The display device was assembled similarly as Example D1 except that the resin composing the particles A and the particles B was replaced to acryl urethane resin EAU203B (available from Asia-kogyo Co., Ltd.) and IPDI-based crosslinking agent Excel-Hardner HX (available from Asia-kogyo Co., Ltd.) in Example D3. The evaluation results are shown in Table D. There was no extraordinary phenomenon in shelf life.

Example D4

The display device was assembled similarly as Example D1 except that the resin composing the particles A and the particles B was replaced to acryl urethane resin EAU203B (available from Asia-kogyo Co., Ltd.) in Example D4. The evaluation results are shown in Table D. Because the crosslinking agent was not used, degradation in storage was found.

Comparative Example D1

The display device was assembled similarly as Example D1 except that the resin composing the particles A and the particles B was replaced to acryl urethane resin EAU53B (available from Asia-kogyo Co., Ltd.) and IPDI-based crosslinking agent Excel-Hardner HX (available from Asia-kogyo Co., Ltd.) in Comparative Example D1. The evaluation results are shown in Table D. There was no extraordinary phenomenon in shelf life.

Example E1

As for particles A, 4 parts by mass (phr) of carbon black (CB) and 2 parts by mass (phr) of BONTRON N07 (available from Orient Chemical Co., Ltd.) as charge control agent were added into 100 parts by mass of thermoplastic polyether ester elastomer: Hytrel7247 (available from DUPONT TORAY CO., LTD.), and after kneading, the mixture was crushed with Jetmill and classified into particles.

As for particles B, 10 parts by mass (phr) of titanium oxide and 2 parts by mass (phr) of BONTRON E89 (available from Orient Chemical Co., Ltd.) as charge control agent were added into 100 parts by mass of thermoplastic polyether ester elastomer: Hytrel7247 (available from DUPONT TORAY CO., LTD.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. Further, the display device was assembled under the managed air conditioning of at the temperature of 25° C. and the humidity of 50% RH. The evaluation results are shown in Table E.

Example E2

The display device was assembled similarly as Example E1 except that the resin composing the particles was replaced to thermoplastic polyether ester elastomer: Hytrel5557 (available from DUPONT TORAY CO., LTD.) in Example E2. The evaluation results are shown in Table E.

Reference Example E1

The display device was assembled similarly as Example E1 except that the filling factor of the particles between the glass substrates was varied to 90% by volume in Reference Example E1. The evaluation results are shown in Table E.

Comparative Example E1

The display device was assembled similarly as Example E1 except that the resin composing the particles was replaced to thermoplastic polyether ester elastomer: Hytrel4057 (available from DUPONT TORAY CO., LTD.) in Comparative Example E1. The evaluation results are shown in Table E.

Comparative Example E2

The display device was assembled similarly as Example E1 except that the resin composing the particles was replaced to nylon resin: TORESIN EF300 (available from Teikoku Chemical Industry Co., Ltd.) in Comparative Example E2. The evaluation results are shown in Table E.

Example F1

As for particles A, 4 parts by mass (phr) of carbon black (CB) and 2 parts by mass (phr) of BONTRON N07 (available from Orient Chemical Co., Ltd.) as charge control agent were added into 100 parts by mass of thermoplastic polyether ester elastomer: Hytrel2751 (available from DUPONT TORAY CO., LTD.), and after kneading, the mixture was crushed with Jetmill and classified into particles.

As for particles B, 10 parts by mass (phr) of titanium oxide and 2 parts by mass (phr) of BONTRON E89 (available from Orient Chemical Co., Ltd.) as charge control agent were added into 100 parts by mass of thermoplastic polyether ester elastomer: Hytrel2751 (available from DUPONT TORAY CO., LTD.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. The evaluation results are shown in Table F.

Example F2

The display device was assembled similarly as Example F1 except that the resin composing the particles was replaced to thermoplastic polyether ester elastomer: Hytrel2571 (available from DUPONT TORAY CO., LTD.) in Example F2. The evaluation results are shown in Table F.

Reference Example F1

The display device was assembled similarly as Example F1 except that the filling factor of the particles between the glasses substrates was varied to 90% by volume in Reference Example F1. The evaluation results are shown in Table F.

Comparative Example F1

The display device was assembled similarly as Example F1 except that the resin composing the particles was replaced to thermoplastic polyether ester elastomer: Hytrel4047 (available from DUPONT TORAY CO., LTD.) in Comparative Example F1. The evaluation results are shown in Table F.

Comparative Example F2

The display device was assembled similarly as Example F1 except that the resin composing the particles was replaced to thermoplastic polyether ester elastomer: Hytrel3548 (available from DUPONT TORAY CO., LTD.) in Comparative Example F2. The evaluation results are shown in Table F.

Example G1

As for particles A, 4 parts by mass (phr) of carbon black (CB) and 2 parts by mass (phr) of BONTRON N07 (available from Orient Chemical Co., Ltd.) as charge control agent were added into 100 parts by mass of thermoplastic polyether ester elastomer: Hytrel6347 (available from DUPONT TORAY CO., LTD.), and after kneading, the mixture was crushed with Jetmill and classified into particles.

As for particles B, 10 parts by mass (phr) of titanium oxide and 2 parts by mass (phr) of BONTRON E89 (available from Orient Chemical Co., Ltd.) as charge control agent were added into 100 parts by mass of thermoplastic polyether ester elastomer: Hytrel6347 (available from DUPONT TORAY CO., LTD.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. The evaluation results are shown in Table G.

Example G2

The display device was assembled similarly as Example G1 except that the resin composing the particles was replaced to thermoplastic polyether ester elastomer: Hytrel6347M (available from DUPONT TORAY CO., LTD.) in Example G2. The evaluation results are shown in Table G.

Reference Example G1

The display device was assembled similarly as Example G1 except that the filling factor of the particles between the glasses substrates was varied to 90% by volume in Reference Example G1. The evaluation results are shown in Table G.

Comparative Example G1

The display device was assembled similarly as Example G1 except that the resin composing the particles was replaced to thermoplastic polyether ester elastomer: Hytrel7247M (available from DUPONT TORAY CO., LTD.) in Comparative Example G1. The evaluation results are shown in Table G.

Comparative Example G2

The display device was assembled similarly as Example G1 except that the resin composing the particles was replaced to thermoplastic polyether ester elastomer: Hytrel7247 F (available from DUPONT TORAY CO., LTD.) in Comparative Example G2. The evaluation results are shown in Table G.

Example H1

As for particles A, 4 parts by mass (phr) of carbon black (CB) and 2 parts by mass (phr) of BONTRON N07 (available from Orient Chemical Co., Ltd.) as charge control agent were added into 100 parts by mass of thermoplastic polyether ester elastomer: Hytrel7247L-01 (available from DUPONT TORAY CO., LTD.), and after kneading, the mixture was crushed with Jetmill and classified into particles.

As for particles B, 10 parts by mass (phr) of titan oxide and 2 parts by mass (phr) of BONTRON E89 (available from Orient Chemical Co., Ltd.) as charge control agent were added into 100 parts by mass of thermoplastic polyether ester elastomer: Hytrel7247L-01 (available from DUPONT TORAY CO., LTD.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. The evaluation results are shown in Table H.

Example H2

The display device was assembled similarly as Example H1 except that the resin composing the particles was replaced to thermoplastic polyether ester elastomer: Hytrel6347L-01 (available from DUPONT TORAY CO., LTD.) in Example H2. The evaluation results are shown in Table H.

Reference Example H1

The display device was assembled similarly as Example H1 except that the filling factor of the particles between the glass substrates was varied to 90% by volume in Reference Example H1. The evaluation results are shown in Table H.

Comparative Example H1

The display device was assembled similarly as Example H1 except that the resin composing the particles was replaced to thermoplastic polyether ester elastomer: Hytrel6347G10 (available from DUPONT TORAY CO., LTD.) in Comparative Example H1. The evaluation results are shown in Table H.

Comparative Example H2

The display device was assembled similarly as Example H1 except that the resin composing the particles was replaced to nylon resin: TORESIN EF300 (available from Teikoku Chemical Industry Co., Ltd.) in Comparative Example H2. The evaluation results are shown in Table H.

Example J1

As for particles A, 4 phr of carbon black (CB) and 2 phr of BONTRON N07 (available from Orient Chemical Co., Ltd.) as charge control agent were added into thermoplastic polyether ester elastomer: Hytrel5077 (available from DUPONT TORAY CO., LTD.), and after kneading, the mixture was crushed with Jetmill and classified into particles.

As for particles B, 10 phr of Titanium oxide and 2 phr of BONTRON N07 (available from Orient Chemical Co., Ltd.) as charge control agent were added into thermoplastic polyether ester elastomer: Hytrel5077 (available from DUPONT TORAY CO., LTD.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. As a gas fulfilling the remained cavities, air with relative humidity of 50% RH was employed. The evaluation results are shown in Table J.

Example J2

The display device was assembled similarly as Example J1 except that the resin composing the particles was replaced to thermoplastic polyether ester elastomer: Hytrel5077 (available from DUPONT TORAY CO., LTD.) in Example J2. The evaluation results are shown in Table J.

Example J3

The display device was assembled similarly as Example J1 except that the filling factor of the particles between the glass substrates was varied to 90% by volume Example J3. The evaluation results are shown in Table J. Because the volume population of the particles was great, the contrast turned worse a little.

Example J4

The display device was assembled similarly as Example J1 except that the relative humidity of the gas in the spaces surrounding the particles was varied to 70% RH at 25° C. in Example J4. The evaluation results are shown in Table J. Because the humidity of the gas in the cavities was high, durability deteriorated a little.

Comparative Example J1

The display device was assembled similarly as Example J1 except that the resin composing the particles was replaced to thermoplastic polyether ester elastomer: Hytrel3548W (available from DUPONT TORAY CO., LTD.) in Comparative Example J1. The evaluation results are shown in Table J. Because the tensile elastic modulus of the resin was small and because the water absorption was large, degradation of durability was tremendous.

Example K1

As for particles A, 4 phr of carbon black (CB) and 2 phr of BONTRON N07 (available from Orient Chemical Co., Ltd.) as charge control agent were added into 100 parts by mass of thermoplastic polyether ester elastomer: Hytrel6377 (available from DUPONT TORAY CO., LTD.), and after kneading, the mixture was crushed with Jetmill and classified into particles.

As for particles B, 10 phr of Titanium oxide and 2 phr of BONTRON N07 (available from Orient Chemical Co., Ltd.) as charge control agent were added into 100 parts by mass of thermoplastic polyether ester elastomer: Hytrel6377 (available from DUPONT TORAY CO., LTD.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. As a gas fulfilling the remained cavities, air with relative humidity of 50% RH was employed. The evaluation results are shown in Table K.

Example K2

The display device was assembled similarly as Example K1 except that the resin composing the particles was replaced to thermoplastic polyether ester elastomer: Hytrel5557M (available from DUPONT TORAY CO., LTD.) in Example K2. The evaluation results are shown in Table K.

Example K3

The display device was assembled similarly as Example K1 except that the filling factor of the particles between the glass substrates was varied to 90% by volume in Example K3. The evaluation results are shown in Table K. Because the volume population of the particles was great, the contrast turned worse a little.

Example K4

The display device was assembled similarly as Example K1 except that the relative humidity of the gas in the cavities surrounding the particles was varied to 70% RH at 25° C. in Example K4. The evaluation results are shown in Table K. Because the humidity of the gas in the cavities was high, durability deteriorated a little.

Comparative Example K1

The display device was assembled similarly as Example K1 except that the resin composing the particles was replaced to thermoplastic polyether ester elastomer: Hytrel3548W (available from DUPONT TORAY CO., LTD.) in Comparative Example K1. The evaluation results are shown in Table K. Because the tensile elastic modulus of the resin was small and because the water absorption was large, degradation of durability was tremendous.

Example L1

As for particles A, 4 phr of carbon black (CB) and 2 phr of BONTRON N07 (available from Orient Chemical Co., Ltd.) as charge control agent were added into 100 parts by mass of thermoplastic polyether ester elastomer: Hytrel5527 (available from DUPONT TORAY CO., LTD.), and after kneading, the mixture was crushed with Jetmill and classified into particles.

As for particles B, 10 phr of Titanium oxide and 2 phr of BONTRON N07 (available from Orient Chemical Co., Ltd.) as charge control agent were added into 100 parts by mass of thermoplastic polyether ester elastomer: Hytrel5527 (available from DUPONT TORAY CO., LTD.), and after kneading, the mixture was crushed with Jetmill and classified into particles.

Between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. As a gas fulfilling the remained cavities, air with relative humidity of 50% RH was employed. The evaluation results are shown in Table L.

Example L2

The display device was assembled similarly as Example L1 except that the resin composing the particles was replaced to thermoplastic polyether ester elastomer: Hytrel2551 (available from DUPONT TORAY CO., LTD.) in Example L2. The evaluation results are shown in Table L.

Example L3

The display device was assembled similarly as Example L1 except that the filling factor of the particles between the glass substrates was varied to 90% by volume in Example L3. The evaluation results are shown in Table L.

Example L4

The display device was assembled similarly as Example L1 except that the relative humidity of the gas in the cavities surrounding the particles was varied to 70% RH at 25° C. in Example L4. The evaluation results are shown in Table L. Because the humidity of the gas in the cavities was high, durability deteriorated a little.

Comparative Example L1

The display device was assembled similarly as Example L1 except that the resin composing the particles was replaced to thermoplastic polyether ester elastomer: Hytrel4057 (available from DUPONT TORAY CO., LTD.) in Comparative Example L1. The evaluation results are shown in Table L. Because the tensile elastic modulus of the resin was small and because the water absorption was large, degradation of durability was tremendous.

Example M1

A display device was assembled as follows:

To begin with, a substrate having electrodes with partition walls was prepared. On a glass substrate having indium oxide electrodes with a thickness of about 500 Å, ribs with a height of 200 μm were made and a partition wall of stripe-shaped single rib configuration was formed.

The ribs are formed as follows: With regard to a paste, preparing a glass powder melting a mixture of $SiO_2$, $Al_2O_3$, $B_2O_3$ and ZnO as inorganic powders, cooling, and crushing; and also preparing a thermosetting epoxy resin as a resin, the paste was provided by adjusting the viscosity to 12000 cps with the use of a solvent.

Next, applying this paste over the entire surface of above-mentioned substrate, cured by heating at the temperature of 150° C., repeated the application and curing, the thickness (equivalent to the height of the partition wall) was adjusted to 200 μm. Then, adhering dry photoresist, provided a mask having a partition pattern with line width of 50 μm, space of 200 μm, and pitch of 250 μm respectively, by exposure and etching. As a result, a partition wall having a predetermined stripe configuration was formed by removing unnecessary portions with the use of sandblast.

Further, both the particles A and the particles B were prepared. As for particles A, blending urethane particles (average particle diameter: 5.8 μm) as mother particles, carbon (average particle diameter: 0.03 μm) as child particles and BONTRON N07 as charge control agent; and fixing the child particles and the charge control agent over the surface of the mother particles with a mechano-fusion method, they were changed into combined particles. As for particles B, blending urethane particles (average particle diameter: 5.8 μm) as mother particles, $TiO_2$ (average particle diameter: 0.015 μm) as child particles and BONTRON E89 as charge control agent; and fixing the child particles and the charge control agent over the surface of the mother particles with a mechano-fusion method, they were changed into combined particles.

Between a pair of the foregoing glass substrates both carrying indium oxide electrodes with the thickness of about 500 Å and ribs respectively and adjusting the space with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glass substrates was adjusted to 60% by volume. As a gas fulfilling the remained cavities, air with relative humidity of 35% RH was employed.

The evaluation results about the particle diameters of each particle, Span of the particle diameter distribution (referred to merely "Span" below), a ratio between the particle diameter of the mother particles and the particle diameter of the child particles, and the solvent-indissoluble ratio of the particles, and the display capability of the assembled image display device are shown in Table M.

Example M2

The display device was assembled similarly as Example M1 except that the material for the mother particles of the particles A was replaced to carbon microbeads ICB in Example M2. The property of each particles and the evaluation results are shown in Table M. Because Span of the particle diameter distribution was large, durability deteriorated a little.

Example M3

The display device was assembled similarly as Example M1 except that the material for the child particles of the particles B was replaced to an acryl containing titanium oxides ($TiO_2$) in Example M3. The property of each particles and the evaluation results are shown in Table M. Because the particle diameter ratio between the mother particles and the child particles of the particles B was large, the minimum driving voltage elevated a little, the initial contrast ratio and the retention fell down a little.

Example M4

The display device was assembled similarly as Example M1 except that the partition wall was not formed in Example M4. The property of each particles and the evaluation results are shown in Table M. Because the partition wall was absent, durability deteriorated a little.

Comparative Example M1

The display device was assembled similarly as Example M1 except that BONTRON N07 was added to the material for the mother particles of the particles A, that BONTRON E89 was added to the material for the mother particles of the particles B and that the child particles were not used in Comparative Example M1. The property of each particles and the evaluation results are shown in Table M. Because the child particles were not used, the driving voltage extremely increased.

Example N1

Acidic charge control agent: BONTRON E84 (available from Orient Chemical Co., Ltd.; salicylic acid metal complex) in an amount of 5% by weight was dissolved in ethanol with the use of a mixer, after removing unsolved component by filtration, Perknock CFB 200W-40 (available from DAINIPPON INK AND CHEMICALS, INCORPORATED; white urethane particles) was added and agitated, then, the mixed solution was filtered with filter paper of 5C and dried at the temperature of 110° C. The measured results about both the averaged particle diameter and the surface charge density of the particle for displaying images are shown in Table N.

Example N2

The particles for displaying images were prepared similarly as Example N1 except that the charge control agent was replaced to BONTRON E89 (available from Orient Chemical Co., Ltd.; phenolic condensate) in Example N2. The measured results about the averaged particle diameter and the surface charge density are shown in Table N.

Example N3

The particles for displaying images were prepared similarly as Example N1 except that the charge control agent was replaced to BONTRON N07 (available from Orient Chemical Co., Ltd.; nigrosine compound) and that the fine particles were replaced to Perknock CFB 620C-40 (available from DAINIPPON INK AND CHEMICALS, INCORPORATED; black urethane particles) in Example N3. The measured results about the averaged particle diameter and the surface charge density are shown in Table N.

Example N4

The particles for displaying images were prepared similarly as Example N1 except that the charge control agent was replaced to BONTRON N21 (available from Orient Chemical Co., Ltd.; resinous acid modified azine) and that the fine particles were replaced to Perknock CFB 101-40 (available from DAINIPPON INK AND CHEMICALS, INCORPORATED; clear color urethane particles) in Example N4. The measured results about the averaged particle diameter and the surface charge density are shown in Table N.

Comparative Example N1

The particles for displaying images were prepared similarly as Example N1 except that the charge control agent was not used in Comparative Example N1. The measured results about the averaged particle diameter and the surface charge density are shown in Table N.

Example P1

As for resin coating particles A, they were prepared by using a spherical fine particles of white polymethylmethacrylate (MBX-5W, available from SEKISUI PLASTICS CO., LTD.; average particle diameter: 4.3 µm), acryl urethane resin (EAU65B, available from Asia-kogyo Co., Ltd.) as a coating resin, and IPDI series crosslinking agent (Excel-Hardner HX, available from Asia-kogyo Co., Ltd.) as a crosslinking agent. The coating method adopted Aggromaster MINI (produced by Hosokawa Micron Co., Ltd.). Spherical fine particles in an amount of 150 g were thrown into a treatment container with the temperature maintained at 80° C., and while rotating an agitation blade with the speed of 600 rpm, they were flowed intensely induced by the introduction of compressed air with the temperature of 80° C. from the bottom part of the treatment container. The above-mentioned acryl urethane resin and crosslinking agent were dissolved in MEK solvent and the solution was sprayed in a misty way from a spray gun for about 30 minutes. After the termination of the spraying, they were further dried for 10 minutes and the resin coating particles A were prepared. The average particle diameter and the variation rate of particle diameter of the resin coating particles A were 7.2 µm, and R=1.67 respectively.

As for resin coating particles B, they were prepared by using spherical fine particles of black polymethylmethacrylate (MBX-5B, available from SEKISUI PLASTICS CO., LTD.; average particle diameter: 5.6 µm) and fluorocarbon polymers (Kyner2751, available from Elph Atochem Japan Co., Ltd) as coating resin. The coating method was the same as particles A.

The average particle diameter and the variation rate of particle diameter of the resin coating particles B were 7.6 µm, and R=1.36 respectively.

Next, the display device was assembled as follows: Namely, between a pair of glass substrates both carrying indium oxide electrodes with the thickness of about 500 Å respectively and adjusting the distance with a spacer to 200 µm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume. The evaluation results about the property of each particles and the display capability are shown in Table P.

Example P2

The display device was assembled similarly as Example P1 except that the resin for coating the resin coating particles A was replaced to nylon resin TORESIN EF300 (available from Teikoku Chemical Industry Co., Ltd.) in Example P2. The evaluation results about the property of each particles and the display capability are shown in Table P.

Example P3

The display device was assembled similarly as Example P1 except that 2 phr of charge control agent BONTRON P51 (available from Orient Chemical Co., Ltd.) was added to the resin for coating the resin coating particles A in Example P3. The evaluation results about the property of each particles and the display capability are shown in Table P. Because the charge control agent was added, the contrast turned better a little.

Example P4

The display device was assembled similarly as Example P1 except that the atomization condition of coating was adjusted and the amount of the coating resin was increased in the preparation of resin coating particles A. The evaluation results about the property of each particles and the display capability are shown in Table P. Because the amount of the coating resin was too much, the retention factor decreased a little.

Example P5

The display device was assembled similarly as Example P1 except that the resin for coating the resin coating particles A was only acryl urethane resin (EAU65B, available from Asia-kogyo Co., Ltd.) in Example P5. The evaluation results about the property of each particles and the display capability are shown in Table P. Because the crosslinking agent was not used, a tremendous degradation occured during storage.

Comparative Example P1

The display device was assembled similarly as Example P1 except that both the particles A and the particles B were used bare without coating resin in Comparative Example P1. The evaluation results about the property of each particles and the display capability are shown in Table P.

Example Q1

PMMA particles (MBX-8, available from SEKISUI PLASTICS CO., LTD.) with average particle diameter of 5.6 µm were employed as central spherical particles, which were previously prepared by polymerization of styrene monomer with AIBN (azo bis iso butyronitrile) among toluene resulting in resin component of number average molecular weight of 20 thousand. The fourth grade ammonium salt-based compound was dissolved as charge control agent in an amount of 0.12 g to 100 g of styrenic resinous paint containing 2.5% by weight of resin component, dispersing 5 g of the foregoing central spherical particles, after drying them with spray dryer, positively charged particles of 5-10 µm were obtained with the use of grinding classifier (FM -120, produced by Japan Pnewmatic Co., Ltd.). A cross-sectional observation about the resulted particles with the use of scanning electron microscope recognized that an outer layer with the thickness of 0.6 to 0.9 µm was formed. Further, the surface charge density of the particles was +42 µC/m$^2$ and the maximum value of surface potential at 0.3 second after the surface potential measurement was 460 V.

Index of refraction of PMMA simple substance as the center particles was 1.49, and index of refraction of styrene resin was 1.60.

A black polymerization toner (spherical particles with average particle diameter of 8 µm, surface charge density: −50 µC/m$^2$, the maximum value of surface potential at 0.3 second after the surface potential measurement: 450 V) for electrophotography was employed as the negative charged particles.

For the purpose of charging the particles, an equivalent amount of both particles were mixed and agitated and frictional charging was conducted.

Among a cell made by connecting a glass substrate whose inside was ITO treated and another copper substrate deployed with a spacer of 200 µm, the mixed particles above were filled by the cavity factor of 70%, a display device was obtained.

The ITO glass substrate and the copper substrate were connected to a power source respectively, and when DC voltage of 250 V was applied in a manner that the former corresponds to a negative electrode and the latter corresponds to positive electrode, positively charged particles flew to the negative electrode and negatively charged particles flew to the positive electrode. As a result, the display device observed through the glass substrate displayed white. Then, when the polarity of applied voltage was reversed, the particles flew to the counter electrodes respectively, and the display device displayed black.

The response time for the applied voltage was measured to be 1 msec. Even after leaving the display device discontinuing the applied voltage for one day, each display was maintained.

Further, although the polarity of the applied voltage was reversed repeatedly for 10,000 times, there was almost no variation of the response speed.

Example R1

The fourth grade ammonium salt-based compound was kneaded as charge control agent into PMMA resin with the use of a Plasto mill, then, crushing into powders with the use of a Coffee mill, indefinite particles of 5-10 µm were obtained with the use of grinding classifier (FM-120, produced by Japan Pnewmatic Co., Ltd.).

A styrene monomer in an amount of 70 parts by weight, AIBN (azo bis iso butyronitrile) in an amount of 0.5 part by weight, and the fourth grade ammonium salt-based compound as charge control agent in an amount of 5 parts by weight were added to 30 parts by weight of the indefinite particles, and they were mixed. The mixed solution was dispersed in 0.5% surfactant (lauryl sodium sulfate) aqueous solution of a quantity of 10 times, and they were suspended and polymerized, and after filtering and drying them, positively charged particles of 5-10 µm were obtained with the use of grinding classifier (FM-120, produced by Japan Pnewmatic Co., Ltd.). The surface charge density of the particles was +43 µC/m$^2$ and the maximum value of surface potential at 0.3 second after the surface potential measurement was 450 V. Index of refraction of PMMA simple substance as the indefinite particle was 1.49, and index of refraction of styrene resin was 1.60.

A black polymerization toner (spherical particles with average particle diameter of 8 µm, surface charge density: −50 µC/m$^2$, maximum value of surface potential at 0.3 second after the surface potential measurement: 450 V) for electrophotography was employed as the negative charged particles.

For the purpose of charging the particles, an equivalent amount of both particles were mixed and agitated and frictional charging was conducted.

Among a cell made by connecting a glass substrate whose inside was ITO treated and another copper substrate deployed with a spacer of 200 µm, the mixed particles above were filled by the cavity factor of 70%, a display device was obtained. The ITO glass substrate and the copper substrate were connected to a power source respectively, and when DC voltage of 250 V was applied in a manner that the former corresponds to a negative electrode and the latter corresponds to positive electrode, positively charged particles flew to the negative electrode and negatively charged particles flew to the positive electrode. As a result, the display device observed through the glass substrate displayed white. Then, when the polarity of applied voltage was reversed, the particles flew to the counter electrodes respectively, and the display device displayed black.

The response time for the applied voltage was measured to be 1 msec. Even after leaving the display device discontinuing the applied voltage for one day, each display was maintained.

Further, although the polarity of the applied voltage was reversed repeatedly for 10,000 times, there was almost no variation of the response speed.

Example S1

As a preparation of the positively charged particles, AIBN (azo bis iso butyronitrile) in an amount of 0.5 part by weight was dissolved in 80 part by weight of methyl methacrylate monomer and 20 part by weight of methacrylic acid 2-(dimethylamino)ethyl monomer, and 20 part by weight of the lipophilicated titanium oxide by coupling treatment was dispersed. The mixed solution was dispersed in 0.5% surfactant (lauryl sodium sulfate) aqueous solution of a quantity of 10 times, and they were suspended and polymerized, and after filtering and drying them, white particles of 5 to 10 µm were obtained with the use of grinding classifier (FM-120, produced by Japan Pnewmatic Co., Ltd.). The surface charge density of the particles was +44 µC/m$^2$ and the maximum value of surface potential at 0.3 second after the surface potential measurement was 410 V.

As a preparation of the negatively charged particles, AIBN (azo bis iso butyronitrile) in an amount of 0.5 part by weight and metal-containing azo compound as dye in an amount of 5 part by weight were dissolved in styrene monomer. The mixed solution was dispersed in 0.5% surfactant (lauryl sodium sulfate) aqueous solution of a quantity of 10 times, and they were suspended and polymerized, and after filtering and drying them, black particles of 5 to 10 μm were obtained with the use of grinding classifier (FM-120, produced by Japan Pnewmatic Co., Ltd.). The surface charge density of the particles was −40 μC/m$^2$ and the maximum value of surface potential at 0.3 second after the surface potential measurement was 480 V. For the purpose of charging the particles, an equivalent amount of both particles were mixed and agitated and frictional charging was conducted.

Among a cell made by connecting a glass substrate whose inside was ITO treated and another copper substrate deployed with a spacer of 200 μm, the mixed particles above were filled by the cavity factor of 70%, a display device was obtained.

The ITO glass substrate and the copper substrate were connected to a power source respectively, and when DC voltage of 250 V was applied in a manner that the former corresponds to a negative electrode and the latter corresponds to positive electrode, positively charged particles flew to the negative electrode and negatively charged particles flew to the positive electrode. As a result, the display device observed through the glass substrate displayed white. Then, when the polarity of applied voltage was reversed, the particles flew to the counter electrodes respectively, and the display device displayed black.

The response time for the applied voltage was measured to be 1 msec. Even after leaving the display device discontinuing the applied voltage for one day, each display was maintained.

Further, although the polarity of the applied voltage was reversed repeatedly for 10,000 times, there was almost no variation of the response speed.

Example T1

As for particles A, charge control agent: BONTRON E84 (available from Orient Chemical Co., Ltd.; salicylic acid metal complex) in an amount of 5% by weight was dissolved in ethanol with the use of a mixer, after removing unsolved component by filtration, Perknock CFB200W-40 (available from DAINIPPON INK AND CHEMICALS, INCORPO-RATED; white urethane particles) was added and agitated, then, the mixed solution was filtered with filter paper of 5C and dried at the temperature of 110° C.

As for particles B, charge control agent: BONTRON N9 (available from Orient Chemical Co., Ltd.) in an amount of 5% by weight was dissolved in ethanol with the use of a mixer, after removing unsolved component by filtration, Perknock CFB 620C-40 (available from DAINIPPON INK AND CHEMICALS, INCORPORATED; black urethane particles) was added and agitated, then, the mixed solution was filtered with filter paper of 5C and dried at the temperature of 110° C.

Next, the display device was assembled as follows: Namely, between a pair of glass substrates both carrying indium oxide electrodes with the thickness of about 500 Å respectively and adjusting the distance with a spacer to 400 μm, the particles A and B above were filled and surrounding edges of the substrates were bonded with epoxy series adhesive jointly enclosing the particles, a display device was obtained. The mixing rate of the particles A and the particles B was determined to the same weight each other respectively and the filling factor of these particles between the glasses substrates was adjusted to 60% by volume.

The evaluation results about the property of each particles and the display capability are shown in Table T.

Example T2

The particles and the display device were prepared similarly as Example T1 except that the charge control agent for the particles B was replaced to aminosilane coupling agent (A1120; available from Nippon Unicar Co., Ltd) in Example T2. The evaluation results about the property of each particles and the display capability are shown in Table T.

Example T3

The particles and the display device were prepared similarly as Example T1 except that the charge control agent for the particles A was not used in Example T3. The evaluation results about the property of each particles and the display capability are shown in Table T.

Comparative Example T1

The particles and the display device were prepared similarly as Example T2 except that the charge control agent for the particles A was not used in Comparative Example T1. The evaluation results about the property of each particles and the display capability are shown in Table T.

TABLE A

|  | Example A1 | Example A2 | Example A3 | Example A4 |
| --- | --- | --- | --- | --- |
| (Particles A) | | | | |
| Particles to be coated | Black toner | Black toner | Black toner | Black toner |
| Coating resin | EAU65B/HX | TORESIN/EF300 | EAU65B/HX | EAU65B/HX |
| Amount of coating resin-1(%) | 4 | 5 | 4 | 38 |
| Charged potential of resin (V) | 8 | 10 | 8 | 8 |
| Solvent-indissoluble ratio of resin (%) | 92 | 89 | 92 | 92 |
| Additive | | | BONTRON P51 | |
| (Particles B) | | | | |
| Particles to be coated | Yellow toner | Yellow toner | Yellow toner | Yellow toner |
| Coating resin | Kyner2751 | Kyner2751 | Kyner2751 | Kyner2751 |
| Amount of coating resin-1(%) | 3 | 3 | 3 | 3 |

TABLE A-continued

|  |  |  |  |  |
|---|---|---|---|---|
| Charged potential of resin (V) | 23 | 23 | 23 | 23 |
| Solvent-indissoluble ratio of resin (%) (Evaluation of display capability −1) | 88 | 88 | 88 | 88 |
| Initial contrast ratio (i) After 10000 times | 7.8 | 7.0 | 8.9 | 8.0 |
| Contrast ratio (ii) Retention % ((ii)/(i)) After leaving 5 days | 7.3 94 | 6.6 94 | 8.2 92 | 7.2 92 |
| Contrast ratio (iii) Retention % ((iii)/(i)) | 7.2 92 | 6.5 92 | 8.0 89 | 6.9 86 |

|  |  | Example A5 | Example A6 | Comp. Ex. A1 |
|---|---|---|---|---|
| (Particles A) |  |  |  |  |
|  | Particles to be coated Coating resin | Black toner ARE6071/ Sumicure M | Black toner EAU65B | Black toner Nothing |
|  | Amount of coating resin-1(%) | 6 | 4 |  |
|  | Charged potential of resin (V) | 330 | 8 |  |
|  | Solvent-indissoluble ratio of resin (%) | 88 | 48 |  |
|  | Additive |  |  |  |
| (Particles B) |  |  |  |  |
|  | Particles to be coated Coating resin | Yellow toner Kyner2751 | Yellow toner Kyner2751 | Yellow toner Kyner2751 |
|  | Amount of coating resin-1(%) | 3 | 3 |  |
|  | Charged potential of resin (V) | 23 | 23 |  |
|  | Solvent-indissoluble ratio of resin (%) (Evaluation of display capability −1) | 88 | 88 |  |
|  | Initial contrast ratio (i) After 10000 times | 7.8 | 7.8 | 7.1 |
|  | Contrast ratio (ii) Retention % ((ii)/(i)) After leaving 5 days | 5.9 76 | 7 90 | 3.9 55 |
|  | Contrast ratio (iii) Retention % ((iii)/(i)) | 5.0 64 | 4.8 61 | 3.0 42 |

TABLE B

|  | Example B1 | Example B2 | Example B3 |
|---|---|---|---|
| (Particles A) |  |  |  |
| Particles | Black toner | Black toner | Carbon Micro Beads PC |
| Span | 0.74 | 1.23 | 2.72 |
| Average Particle Diameter (i) (μm) | 7.0 | 9.2 | 12.5 |
| Solvent-indissoluble ratio (%) | 8.9 | 89 | 87 |
| (Particles B) |  |  |  |
| Particles | Yellow toner | Yellow toner | Yellow Toner |
| Span | 0.66 | 0.66 | 0.66 |
| Average Particle Diameter (ii) (μm) | 9.1 | 9.1 | 9.1 |
| Solvent-indissoluble ratio (%) | 92 | 92 | 92 |
| Particle Diameter ratio ((ii)/(i)) | 1.3 | 1 | 1.4 |

TABLE B-continued

| (Evaluation of display capability −2) | | | |
|---|---|---|---|
| Initial Contrast ratio (iii) After 1000 times | 7.1 | 6.9 | 7.2 |
| Contrast ratio (iv) | 6.6 | 6.2 | 6.6 |
| Retention ((iv)/(iii)) After leaving 5 days | 93 | 90 | 92 |
| Contrast ratio (vi) | 6.5 | 6.1 | 6.3 |
| Retention ((vi)/(iii)) | 92 | 88 | 87 |

| | Example B4 | Example B5 | Comp. Ex. B1 |
|---|---|---|---|
| (Particles A) | | | |
| Particles | AER6071/Carbon | Carbon Micro Beads MSB | Carbon Micro Beads ICB |
| Span | 4.8 | 4.9 | 8.4 |
| Average Particle Diameter (i) (μm) | 19.2 | 62.8 | 471.4 |
| Solvent-indissoluble ratio (%) | 49 | 87 | 87 |
| (Particles B) | | | |
| Particles | Yellow toner | Yellow toner | Yellow toner |
| Span | 0.66 | 0.66 | 0.66 |
| Average Particle Diameter (ii) (μm) | 9.1 | 9.1 | 9.1 |
| Solvent-indissoluble ratio (%) | 92 | 92 | 92 |
| Particle Diameter ratio ((ii)/(i)) | 2.1 | 6.87 | 51.6 |
| (Evaluation of display capability −2) | | | |
| Initial Contrast ratio (iii) After 1000 times | 6.9 | 5.0 | 4.3 |
| Contrast ratio (iv) | 6.0 | 3.5 | 2.15 |
| Retention ((iv)/(iii)) After leaving 5 days | 87 | 70 | 50 |
| Contrast ratio (vi) | 4.21 | 3.4 | 1.76 |
| Retention ((vi)/(iii)) | 61 | 68 | 41 |

TABLE C

| | Example C1 | Example C2 |
|---|---|---|
| (Particles A) | | |
| Resin material | EAU206B/HX | EAU205B/HX |
| Aditive | CB/BONTRON N07 | CB/BONTRON N07 |
| (Particles B) | | |
| Resin material | EAU206B/HX | EAU205B/HX |
| Aditive | $TiO_2$/BONTRON E89 | $TiO_2$/BONTRON E89 |
| Surface Potential of Resin (V) | 405 | 380 |
| Solvent-indissoluble ratio of resin (%) | 92 | 89 |
| (Evaluation of display capability −3) | | |
| Reflection Density at 10 times (i) | 1.8 | 1.7 |
| Reflection Density after leaving 10 days (ii) | 1.6 | 1.5 |
| Retention ((ii)/(i), %) | 92 | 88 |

| | Example C3 | Comp. Ex. C1 |
|---|---|---|
| (Particles A) | | |
| Resin material | EAU206B | EAU188B/HX |
| Additive | CB/BONTRON N07 | CB/BONTRON N07 |
| (Particles B) | | |
| Resin material | EAU206B | EAU188B/HX |
| Additive | $TiO_2$/BONTRON E89 | $TiO_2$/BONTRON E89 |
| Surface Potential of Resin (V) | 405 | 156 |
| Solvent-indissoluble ratio of resin (%) | 48 | 90 |

TABLE C-continued

| (Evaluation of display capability −3) | | |
|---|---|---|
| Reflection Density at 10 times (i) | 1.7 | 1.7 |
| Reflection Density after leaving 10 days (ii) | 1.4 | 0.6 |
| Retention ((ii)/(i), %) | 82 | 35 |

TABLE D

| | Example D1 | Example D2 | Example D3 |
|---|---|---|---|
| (Particles A) | | | |
| Resin material | EAU204B/HX | EAU203B/HX | EAU204B/HX |
| Additive | CB/BONTRON N07 | CB/BONTRON N07 | CB/BONTRON N07 |
| Surface Potential (V) | 430 | 305 | 430 |
| Solvent-indissoluble ratio of resin (%) | 90 | 86 | 90 |
| (Particles B) | | | |
| Resin material | EAU204B/HX | EAU203B/HX | EAU203B/HX |
| Additive | TiO$_2$/BONTRON E89 | TiO$_2$/BONTRON E89 | TiO$_2$/BONTRON E89 |
| Surface Potential (V) | 400 | 320 | 320 |
| Solvent-indissoluble ratio of resin (%) | 90 | 87 | 87 |
| Surface Potential Difference (V) between Particles A and Particles B | 30 | 15 | 110 |
| (Evaluation of display capability −3) | | | |
| Reflection Density at 10 times (i) | 1.90 | 1.75 | 1.69 |
| Reflection Density after leaving 10 days (ii) | 1.73 | 1.54 | 1.35 |
| Retention ((ii)/(i), %) | 91 | 88 | 80 |

| | Example D4 | Comp. Ex. D1 |
|---|---|---|
| (Particles A) | | |
| Resin material | EAU204B | EAU53B/HX |
| Additive | CB/BONTRON N07 | CB/BONTRON N07 |
| Surface Potential (V) | 410 | 60 |
| Solvent-indissoluble ratio of resin (%) | 48 | 87 |
| (Particles B) | | |
| Resin material | EAU204B | EAU188B/HX |
| Additive | TiO$_2$/BONTRON E89 | TiO$_2$/BONTRON E89 |
| Surface Potential (V) | 390 | 75 |
| Solvent-indissoluble ratio of resin (%) | 48 | 87 |
| Surface Potential Difference (V) between Particles A and Particles B | 30 | 15 |
| (Evaluation of display capability −3) | | |
| Reflection Density at 10 times (i) | 1.89 | 1.7 |
| Reflection Density after leaving 10 days (ii) | 1.66 | 0.61 |
| Retention ((ii)/(i), %) | 88 | 36 |

TABLE E

| | Example E1 | Example E2 | Ref. Example E1 |
|---|---|---|---|
| (Particles A) | | | |
| Resin material | Hytrel7247 | Hytrel5557 | Hytrel7247 |
| Additive | CB/BONTRON N07 | CB/BONTRON N07 | CB/BONTRON N07 |
| (Particles B) | | | |
| Resin material | Hytrel7247 | Hytrel5557 | Hytrel7247 |
| Additive | TiO$_2$/BONTRON E89 | TiO$_2$/BONTRON E89 | TiO$_2$/BONTRON E89 |
| Surface Hardness (deg.) of resin at 0° C. | 75 | 58 | 75 |

TABLE E-continued

| | | | |
|---|---|---|---|
| Surface Hardness (deg.) of resin at 25° C. | 71 | 55 | 71 |
| Surface Hardness (deg.) of resin at 100° C. | 61 | 44 | 61 |
| Surface Hardness at 0° C./Surface Hardness at 100° C. | 1.23 | 1.32 | 1.23 |
| Volume Population (%) of Particle | 60 | 60 | 90 |
| Water-absorption (%) of resin | 0.3 | 0.4 | 0.3 |
| Solvent-indissoluble ratio (%) of resin (Evaluation of display capability –4) | 92 | 93 | 92 |
| Contrast ratio at 0° C. | 8.22 | 8.18 | 6.20 |
| Contrast ratio at 25° C. | 8.19 | 8.11 | 6.15 |
| Contrast ratio at 60° C. | 7.99 | 7.88 | 6.02 |

| | Comp. Ex. E1 | Comp. Ex. E2 |
|---|---|---|
| (Particles A) | | |
| Resin material | Hytrel4057 | TORESIN EF300 |
| Additive | CB/BONTRON N07 | CB/BONTRON N07 |
| (Particles B) | | |
| Resin material | Hytrel4057 | TORESIN EF300 |
| Additive | TiO$_2$/ BONTRON E89 | TiO$_2$/ BONTRON E89 |
| Surface Hardness (deg.) of resin at 0° C. | 44 | 41 |
| Surface Hardness (deg.) of resin at 25° C. | 39 | 31 |
| Surface Hardness (deg.) of resin at 100° C. | 25 | 16 |
| Surface Hardness at 0° C./ Surface Hardness at 100° C. | 1.76 | 2.63 |
| Volume Population (%) of Particle | 60 | 60 |
| Water-absorption (%) of resin | 0.8 | 5.3 |
| Solvent-indissoluble ratio (%) of resin (Evaluation of display capability –4) | 93 | 86 |
| Contrast ratio at 0° C. | 8.16 | 8.00 |
| Contrast ratio at 25° C. | 8.01 | 7.99 |
| Contrast ratio at 60° C. | 3.84 | 2.55 |

TABLE F

| | Example F1 | Example F2 | Ref. Example F1 |
|---|---|---|---|
| (Particles A) | | | |
| Resin material | Hytrel2751 | Hytrel2571 | Hytrel2751 |
| Additive | CB/BONTRON N07 | CB/BONTRON N07 | CB/BONTRON N07 |
| (Particles B) | | | |
| Resin material | Hytrel2751 | Hytrel2571 | Hytrel2751 |
| Additive | TiO$_2$/BONTRON E89 | TiO$_2$/BONTRON E89 | TiO$_2$/BONTRON E89 |
| Tensile break strength (Mpa) of resin | 35.0 | 29.0 | 35.0 |
| Volume Population (%) of Particle | 60 | 60 | 90 |

TABLE F-continued

| | | | |
|---|---|---|---|
| Water-absorption (%) of resin | 0.2 | 0.2 | 0.2 |
| Solvent-indissoluble ratio (%) of resin (Evaluation of display capability −5) | 91 | 92 | 91 |
| Initial Contrast ratio | 8.22 | 8.12 | 6.50 |
| Contrast ratio after 10000 times (Retention) | 7.41(90%) | 7.15(88%) | 5.91(91%) |

| | Comp. Ex. F1 | Comp. Ex. F2 |
|---|---|---|
| (Particles A) | | |
| Resin material | Hytrel4047 | Hytrel3548 |
| Additive | CB/BONTRON N07 | CB/BONTRON N07 |
| (Particles B) | | |
| Resin material | Hytrel4047 | Hytrel3548 |
| Additive | $TiO_2$/BONTRON E89 | $TiO_2$/BONTRON E89 |
| Tensile break strength (Mpa) of resin | 19.3 | 11.5 |
| Volume Population (%) of Particle | 60 | 60 |
| Water-absorption (%) of resin | 0.8 | 3.6 |
| Solvent-indissoluble ratio (%) of resin (Evaluation of display capability −5) | 92 | 92 |
| Initial Contrast ratio | 8.23 | 8.01 |
| Contrast ratio after 10000 times (Retention) | 5.02(61%) | 4.24(53%) |

TABLE G

| | Example G1 | Example G2 | Ref. Example. G1 |
|---|---|---|---|
| (Particles A) | | | |
| Resin material | Hytrel6347 | Hytrel6347M | Hytrel6347 |
| Additive | CB/BONTRON N07 | CB/BONTRON N07 | CB/BONTRON N07 |
| (Particles B) | | | |
| Resin material | Hytrel6347 | Hytrel6347M | Hytrel6347 |
| Additive | $TiO_2$/BONTRON E89 | $TiO_2$/BONTRON E89 | $TiO_2$/BONTRON E89 |
| Izod Impact Strength (with Notch) (J/m) of resin | 240 | 130 | 240 |
| Volume Population (%) of Particle | 60 | 60 | 90 |
| Water-absorption (%) of resin | 0.4 | 0.4 | 0.4 |
| Solvent-indissoluble ratio (%) of resin (Evaluation of display capability −5) | 93 | 92 | 93 |
| Initial Contrast ratio | 8.20 | 8.09 | 6.40 |
| Contrast ratio after 10000 times (Retention) | 7.46(91%) | 7.04(87%) | 5.70(89%) |

| | Comp. Ex. G1 | Comp. Ex. G2 |
|---|---|---|
| (Particles A) | | |
| Resin material | Hytrel7247M | Hytrel7247F |
| Additive | CB/BONTRON N07 | CB/BONTRON N07 |
| (Particles B) | | |
| Resin material | Hytrel7247M | Hytrel7247F |
| Additive | $TiO_2$/BONTRON E89 | $TiO_2$/BONTRON E89 |
| Izod Impact Strength (with Notch) (J/m) of resin | 90 | 50 |
| Volume Population (%) of Particle | 60 | 60 |

TABLE G-continued

|  |  |  |
|---|---|---|
| Water-absorption (%) of resin | 0.3 | 0.2 |
| Solvent-indissoluble ratio (%) of resin (Evaluation of display capability −5) | 92 | 92 |
| Initial Contrast ratio | 8.19 | 8.15 |
| Contrast ratio after 10000 times (Retention) | 4.83(59%) | 3.91(48%) |

TABLE H

|  | Example H1 | Example H2 | Ref. Example H1 |
|---|---|---|---|
| (Particles A) |  |  |  |
| Resin material | Hytrel7247L-01 | Hytrel6347L-01 | Hytrel7247L-01 |
| Additive | CB/BONTRON N07 | CB/BONTRON N07 | CB/BONTRON N07 |
| (Particles B) |  |  |  |
| Resin material | Hytrel7247L-01 | Hytrel6347L-01 | Hytrel7247L-01 |
| Additive | TiO$_2$/BONTRON E89 | TiO$_2$/BONTRON E89 | TiO$_2$/BONTRON E89 |
| Abrasion loss (Taber) (mg) | 8.1 | 9.2 | 8.1 |
| Volume Population (%) of Particle | 60 | 60 | 90 |
| Water-absorption (%) of resin | 0.3 | 0.3 | 0.3 |
| Solvent-indissoluble ratio (%) of resin (Evaluation of display capability −5) | 93 | 91 | 93 |
| Initial Contrast ratio | 8.25 | 8.22 | 6.11 |
| Contrast ratio after 10000 times (Retention) | 7.51(91%) | 7.23(88%) | 5.25(86%) |

|  | Comp. Ex. H1 | Comp. Ex. H2 |
|---|---|---|
| (Particles A) |  |  |
| Resin material | Hytrel6347G10 | TORESINEF300 |
| Additive | CB/BONTRON N07 | CB/BONTRON N07 |
| (Particles B) |  |  |
| Resin material | Hytrel6347G10 | TORESIN EF300 |
| Additive | TiO$_2$/BONTRON E89 | TiO$_2$/BONTRON E89 |
| Abrasion loss (Taber) (mg) | 28.2 | 32.9 |
| Volume Population (%) of Particle | 60 | 60 |
| Water-absorption (%) of resin | 0.3 | 5.3 |
| Solvent-indissoluble ratio (%) of resin (Evaluation of display capability −5) | 92 | 86 |
| Initial Contrast ratio | 8.14 | 7.88 |
| Contrast ratio after 10000 times (Retention) | 3.91(48%) | 2.44(31%) |

TABLE J

|  | Example J1 | Example J2 | Example J3 |
|---|---|---|---|
| (Particles A) |  |  |  |
| Resin | Hytrel5077 | Hytrel4777 | Hytrel5077 |
| Additive | CB/BONTRON N07 | CB/BONTRON N07 | CB/BONTRON N07 |

TABLE J-continued

| (Particles B) | | | |
|---|---|---|---|
| Resin | Hytrel5077 | Hytrel4777 | Hytrel5077 |
| Additive | TiO$_2$/BONTRON E89 | TiO$_2$/BONTRON E89 | TiO$_2$/BONTRON E89 |
| Volume Population (%) of Particle | 60 | 60 | 90 |
| Relative Humidity (% RH) of Air in cavities | 50 | 50 | 50 |
| (Physical Property evaluation of resin) | | | |
| Tensile Elastic Modulus (Mpa) | 84.4 | 56.4 | 84.4 |
| Water absorption (% by weight) | 0.6 | 0.7 | 0.6 |
| Solvent-indissoluble ratio of resin (%) | 91 | 92 | 91 |
| (Evaluation of display capability −5) | | | |
| Initial Contrast ratio (i) | 8.20 | 8.11 | 6.4 |
| Contrast ratio (ii) after 10000 times repetition | 7.38 | 7.06 | 5.71 |
| Retention ((ii)/(i), %) | 90 | 87 | 89 |

| | Example J4 | Comp. Ex. J1 |
|---|---|---|
| (Particles A) | | |
| Resin | Hytrel5077 | Hytrel3548W |
| Additive | CB/BONTRON N07 | CB/BONTRON N07 |
| (Particles B) | | |
| Resin | Hytrel5077 | Hytrel3548W |
| Additive | TiO$_2$/BONTRON E89 | TiO$_2$/BONTRON E89 |
| Volume Population (%) of Particle | 60 | 60 |
| Relative Humidity (% RH) of Air in cavities | 70 | 50 |
| (Physical Property evaluation of resin) | | |
| Tensile Elastic Modulus (Mpa) | 84.4 | 21.3 |
| Water absorption (% by weight) | 0.6 | 3.6 |
| Solvent-indissoluble ratio of resin (%) | 91 | 92 |
| (Evaluation of display capability −5) | | |
| Initial Contrast ratio (i) | 8.18 | 8.0 |
| Contrast ratio (ii) after 10000 times repetition | 6.71 | 4.24 |
| Retention ((ii)/(i), %) | 82 | 51 |

TABLE K

| | Example K1 | Example K2 | Example K3 |
|---|---|---|---|
| (Particles A) | | | |
| Resin | Hytrel6377 | Hytrel5557M | Hytrel6377 |
| Additive | CB/BONTRON N07 | CB/BONTRON N07 | CB/BONTRON N07 |
| (Particles B) | | | |
| Resin | Hytrel6377 | Hytrel5557M | Hytrel6377 |
| Additive | TiO$_2$/BONTRON E89 | TiO$_2$/BONTRON E89 | TiO$_2$/BONTRON E89 |
| Volume Population (%) of Particle | 60 | 60 | 90 |
| Relative Humidity (% RH) of Air in cavities | 50 | 50 | 50 |

TABLE K-continued

| (Physical Property evaluation of resin) | | | |
|---|---|---|---|
| Tensile Elastic Modulus (Mpa) | 355 | 236 | 355 |
| Water absorption (% by weight) | 0.4 | 0.4 | 0.4 |
| Solvent-indissoluble ratio of resin (%) | 91 | 92 | 91 |
| (Evaluation of display capability −5) | | | |
| Initial Contrast ratio (i) | 8.23 | 8.20 | 6.4 |
| Contrast ratio (ii) after 10000 times repetition | 7.49 | 7.22 | 5.73 |
| Retention ((ii)/(i), %) | 91 | 88 | 89 |

| | Example K4 | Comp. Ex. K1 |
|---|---|---|
| (Particles A) | | |
| Resin | Hytrel6377 | Hytrel3548W |
| Additive | CB/BONTRON N07 | CB/BONTRON N07 |
| (Particles B) | | |
| Resin | Hytrel6377 | Hytrel3548W |
| Additive | TiO$_2$/BONTRON E89 | TiO$_2$/BONTRON E89 |
| Volume Population (%) of Particle | 60 | 60 |
| Relative Humidity (% RH) of Air in cavities | 70 | 50 |
| (Physical Property evaluation of resin) | | |
| Tensile Elastic Modulus (Mpa) | 355 | 402 |
| Water absorption (% by weight) | 0.4 | 3.6 |
| Solvent-indissoluble ratio of resin (%) | 91 | 92 |
| (Evaluation of display capability −5) | | |
| Initial Contrast ratio (i) | 8.20 | 8.00 |
| Contrast ratio (ii) after 10000 times repetition | 6.56 | 4.16 |
| Retention ((ii)/(i), %) | 80 | 52 |

TABLE L

| | Example L1 | Example L2 | Example L3 |
|---|---|---|---|
| (Particles A) | | | |
| Resin | Hytrel5527 | Hytrel2551 | Hytrel5527 |
| Additive | CB/BONTRON N07 | CB/BONTRON N07 | CB/BONTRON N07 |
| (Particles B) | | | |
| Resin | Hytrel5527 | Hytrel2551 | Hytrel5527 |
| Additive | TiO$_2$/BONTRON E89 | TiO$_2$/BONTRON E89 | TiO$_2$/BONTRON E89 |
| Volume Population (%) of Particle | 60 | 60 | 90 |
| Relative Humidity (% RH) of Air in cavities | 50 | 50 | 50 |
| (Physical Property evaluation of resin) | | | |
| Tear Strength (kg/cm) | 232 | 216 | 232 |

TABLE L-continued

| | | | |
|---|---|---|---|
| Water absorption (% by weight) | 0.4 | 0.6 | 0.4 |
| Solvent-indissoluble ratio of resin (%) (Evaluation of display capability −5) | 91 | 92 | 91 |
| Initial Contrast ratio (i) | 8.18 | 8.10 | 6.4 |
| Contrast ratio (ii) after 10000 times repetition | 7.28 | 6.97 | 5.62 |
| Retention ((ii)/(i), %) | 89 | 86 | 88 |

| | Example L4 | Comp. Ex. L1 |
|---|---|---|
| (Particles A) | | |
| Resin | Hytrel5527 | Hytrel4057 |
| Additive | CB/ BONTRON N07 | CB/ BONTRON N07 |
| (Particles B) | | |
| Resin | Hytrel5527 | Hytrel4057 |
| Additive | $TiO_2$/BONTRON E89 | $TiO_2$/BONTRON E89 |
| Volume Population (%) of Particle | 60 | 60 |
| Relative Humidity (% RH) of Air in cavities (Physical Property evaluation of resin) | 70 | 50 |
| Tear Strength (kg/cm) | 232 | 95 |
| Water absorption (% by weight) | 0.4 | 0.8 |
| Solvent-indissoluble ratio of resin (%) (Evaluation of display capability −5) | 91 | 92 |
| Initial Contrast ratio (i) | 8.15 | 8.00 |
| Contrast ratio (ii) after 10000 times repetition | 6.56 | 4.00 |
| Retention ((ii)/(i), %) | 80 | 50 |

TABLE M

| | Example M1 | Example M2 | Example M3 |
|---|---|---|---|
| (Particles A) | | | |
| Mother particles, material | Urethane | Carbon micro beads | Urethane |
| (Charge control agent) | | | |
| Particle diameter (M)(μm) | 5.8 | 471.4 | 5.8 |
| Span | 1.8 | 8.4 | 1.8 |
| Child particles, material | Carbon | Carbon | Carbon |
| (Charge control agent) | BONTRON NO7 | BONTRON NO7 | BONTRON NO7 |
| Particle diameter (C)(μm) | 0.03 | 0.03 | 0.03 |
| Particle diameter ratio (M/C) | 193 | 1571 | 193 |
| Solvent-indissoluble ratio of particles (%) | 90 | 89 | 90 |
| (Particles B) | | | |
| Mother particles, material | Urethane | Urethane | Urethane |
| (Charge control agent) | | | |
| Particle diameter (M)(μm) | 5.8 | 5.8 | 5.8 |
| Span | 1.8 | 1.8 | 1.8 |
| Child particles, material | $TiO_2$ | $TiO_2$ | $TiO_2$ |
| (Charge control agent) | BONTRON E89 | BONTRON E89 | BONTRON E89 |
| Particle diameter (C)(μm) | 0.015 | 0.015 | 0.3 |

TABLE M-continued

|  | Example M1 | Example M2 | Example M3 |
|---|---|---|---|
| Particle diameter ratio (M/C) | 386 | 386 | 19 |
| Solvent-indissoluble ratio of particles (%) | 92 | 92 | 86 |
| Compounding method of particles | Mechano-fusion | Mechano-fusion | Mechano-fusion |
| Relative humidity (% RH) of air in cavities | 35 | 35 | 35 |
| Presence or Absence of partition wall | Present | Present | Present |
| (Evaluation of display capability −6) | | | |
| The Minimum driving voltage (V) | 22 | 29 | 9.5 |
| Initial contrast ratio | 7.3 | 7.11 | 6.9 |
| Contrast ratio after 10000 times (retention) | 6.42(88%) | 5.40(76%) | 5.31(77%) |
| Contrast ratio after leaving 5 days (retention) | 6.13(84%) | 5.18(73%) | 4.83(70%) |

|  | Example M4 | Comp. Ex. M1 |
|---|---|---|
| (Particles A) | | |
| Mother particles, material | Urethane | Urethane |
| (Charge control agent) | | BONTRON N07 |
| Particle diameter (M)(μm) | 5.8 | 5.8 |
| Span | 1.8 | 1.8 |
| Child particles, material | Carbon | Nothing |
| (Charge control agent) | BONTRON N07 | |
| Particle diameter (C)(μm) | 0.03 | |
| Particle diameter ratio (M/C) | 193 | |
| Solvent-indissoluble ratio of particles (%) | 90 | |
| (Particles B) | | |
| Mother particles, material | Urethane | Urethane |
| (Charge control agent) | | BONTRON E89 |
| Particle diameter (M)(μm) | 5.8 | 5.8 |
| Span | 1.8 | 1.8 |
| Child particles, material | $TiO_2$ | Nothing |
| (Charge control agent) | BONTRON E89 | |
| Particle diameter (C)(μm) | 0.015 | |
| Particle diameter ratio (M/C) | 386 | 386 |
| Solvent-indissoluble ratio of particles (%) | 92 | 92 |
| Compounding method of particles | Mechano-fusion | Nothing |
| Relative humidity (% RH) of air in cavities | 35 | 35 |
| Presence or Absence of partition wall | Absent | Present |
| (Evaluation of display capability −6) | | |
| The Minimum driving voltage (V) | 22 | 220 |
| Initial contrast ratio | 7.2 | 7.9 |
| Contrast ratio after 10000 times (retention) | 6.05(84%) | 6.95(88%) |
| Contrast ratio after leaving 5 days (retention) | 5.76(80%) | 6.56(83%) |

TABLE N

|  | Example N1 | Example N2 | Example N3 |
|---|---|---|---|
| Fine particles | CFB200W-40 | CFB200W-40 | CFB620-40 |
| Charge control agent | BONTRON E84 | BONTRON E89 | BONTRON N07 |
| Color | White | White | Black |
| Average particle diameter (μm) | 8.2 | 8.2 | 8.2 |
| Surface charge density (μC/m$^2$) | −15 | −21 | 16 |

|  | Example N4 | Comp. EX. N1 |
|---|---|---|
| Fine particles | CFB101-40 | CFB200W-40 |
| Charge control agent | BONTRON N21 | |
| Color | Black | White |

TABLE N-continued

|  | Example N1 | Example N2 | Example N3 |
|---|---|---|---|
| Average particle diameter (μm) |  | 8.2 | 8.2 |
| Surface charge density (μm/m$^2$) |  | 35 | −3 |

TABLE P

|  | Example P1 | Example P2 | Example P3 |
|---|---|---|---|
| (Particles A) |  |  |  |
| Nuclear particles | MBX-5W | MBX-5W | MBX-5W |
| Coating resin material | EAU65B | EF300 | EAU65B |
| Cross-linking agent | HX | HX | HX |
| Charge control agent |  |  | BONTRON P51 |
| Amount of coating resin −2(%) | 4 | 5 | 4 |
| Changing ratio of particle diameter (%) | 1.67 | 1.82 | 1.73 |
| Solvent-indissoluble ratio of particles (%) | 92 | 89 | 92 |
| (Particles B) |  |  |  |
| Nuclear particles | MBX-5B | MBX-5B | MBX-5B |
| Coating resin material | Kyner2751 | Kyner2751 | Kyner2751 |
| Amount of coating resin −2(%) | 3 | 3 | 3 |
| Changing ratio of particle diameter (%) | 1.36 | 1.36 | 1.36 |
| Solvent-indissoluble ratio of particles (%) | 88 | 88 | 88 |
| (Evaluation of display capability −7) Contrast ratio (retention) |  |  |  |
| Initial | 7.8 | 7.0 | 8.9 |
| After 10000 times | 7.9(94) | 6.6(94) | 8.2(92) |
| After leaving 5 days | 7.2(92) | 6.5(92) | 8.0(89) |

|  | Example P4 | Example P5 | Comp. Example P1 |
|---|---|---|---|
| (Particles A) |  |  |  |
| Nuclear particles | MBX-5W | MBX-5W | MBX-5W |
| Coating resin material | EAU65B | EAU65B |  |
| Cross-linking agent | HX |  |  |
| Charge control agent |  |  |  |
| Amount of coating resin −2(%) | 38 | 4 |  |
| Changing ratio of particle diameter (%) | 3.56 | 1.70 |  |
| Solvent-indissoluble ratio of particles (%) | 92 | 48 |  |
| (Particles B) |  |  |  |
| Nuclear particles | MBX-5B | MBX-5B | MBX-5B |
| Coating resin material | Kyner2751 | Kyner2751 |  |
| Amount of coating resin −2 (%) | 3 | 3 |  |
| Changing ratio of particle diameter (%) | 1.36 | 1.36 |  |
| Solvent-indissoluble ratio of particles (%) | 88 | 88 |  |
| (Evaluation of display capability −7) Contrast ratio (retention) |  |  |  |
| Initial | 8.0 | 7.8 | 7.1 |
| After 10000 times | 7.2(90) | 7.0(90) | 3.9(55) |
| After leaving 5 days | 6.9(86) | 4.8(61) | 3.0(42) |

TABLE T

|  | Example T1 | Example T2 |
|---|---|---|
| (Particles A) |  |  |
| Material | CFB200W-40 | CFB200W-40 |
| Surface treatment | BONTRON E89 | BONTRON E89 |
| Color | White | White |
| Particle diameter (μm) | 14.6 | 14.6 |
| Surface charge density (μC/m$^2$) | −38.1 | −38.1 |
| (Particles B) |  |  |
| Material | CFB620-C | CFB620-C |
| Surface treatment | BONTRON N21 | A1120 |
| Color | Black | Black |
| Particle diameter (μm) | 13.6 | 13.6 |
| Surface charge density (μC/m$^2$) | 36.1 | 10.7 |
| Difference of Surface charge density (μC/m$^2$) | 74.2 | 48.8 |
| (Evaluation of display capability −8) Image density |  |  |
| When entirely displaying white (A) | 0.15 | 0.15 |
| When entirely displaying black (B) | 1.3 | 1.24 |
| Contrast ratio (B/A) | 8.6 | 8.3 |
| Unevenness while entirely displaying | A | A |

|  | Example T3 | Comp. Example T1 |
|---|---|---|
| (Particles A) |  |  |
| Material | CFB200W-40 | CFB200W-40 |
| Surface treatment |  |  |
| Color | White | White |
| Particle diameter (μm) | 14.6 | 14.6 |
| Surface charge density (μC/m$^2$) | −0.2 | −0.2 |
| (Particles B) |  |  |
| Material | CFB620-C | CFB620-C |
| Surface treatment | BONTRON N21 | A1120 |
| Color | Black | Black |
| Particle diameter (μm) | 13.6 | 13.6 |
| Surface charge density (μC/m$^2$) | 36.1 | 10.7 |
| Difference of Surface charge density (μC/m$^2$) | 36.3 | 10.9 |
| (Evaluation of display capability −8) Image density |  |  |
| When entirely displaying white (A) | 0.23 | 0.34 |
| When entirely displaying black (B) | 1.3 | 1.05 |
| Contrast ratio (B/A) | 5.7 | 3.1 |
| Unevenness while entirely displaying | A~B | C |

INDUSTRIAL APPLICABILITY

In accordance with the present invention, the following effects will be obtained.

(i) By preparing the ingredients for the particles coated with resin, image display devices should be schemed for elevated capability and durability should be improved.

(ii) By preparing the ingredients for the particles with a small Span of the particle diameter distribution, an image with a great contrast ratio should be obtained and durability should be improved.

(iii) By preparing the ingredients for the particles with slow charge attenuation, an image display device superior in stability and, particularly, in memory characteristic should be obtained.

(iv) By preparing the ingredients for the particles regulating the ratio between the surface hardness at the temperature of 0° C. and the surface hardness at the temperature of 100° C., an image display device superior in stability and, particularly, in response to the change of the temperature should be obtained.

(v) By preparing the ingredients for the particles regulating the tensile break strength, an image display device superior in stability and, particularly, in response to the change of the temperature should be obtained.

(vi) By preparing the ingredients for the particles regulating the Izod impact strength, an image display device superior in stability and, particularly, in response to the change of the temperature should be obtained.

(vii) By preparing the ingredients for the particles regulating the abrasion loss (Taber), an image display device superior in stability and, particularly, in response to the change of the temperature should be obtained.

(viii) By preparing the ingredients for the particles regulating the tensile elastic modulus, an image display device having capability of displaying the images superior in stability and, particularly, in repetition durability should be obtained.

(ix) By preparing the ingredients for the particles regulating the flexural elastic modulus, an image display device having capability of displaying the images superior in stability and, particularly, in repetition durability should be obtained.

(x) By preparing the ingredients for the particles regulating the tear strength, an image display device having capability of displaying the images superior in stability and, particularly, in repetition durability should be obtained.

(xi) By preparing a group of combined particles comprising mother particles whereon many child particles of at least one kind adhere, an image display device having capability of displaying the images superior in repetition durability at a low driving voltage, cheap, and achieving the compatibility of improving stability and reducing the driving voltage should be obtained.

(xii) By preparing the ingredients for the particles obtained by surface treating fine particles with a solution of charge control agent, attachment of charging ability over the particles should be sufficiently carried out and an ideal flight and movement should be realized in an occasion of forming an electric field, and accordingly, favorable images with sufficient contrast should be stably obtained.

(xiii) By preparing the ingredients for the particles obtained by resin coating them by means of spraying a solution of dissolving resin, an aggregation of the particles should be prevented and favorable images with extended longevity against repeating display and with superior stability should be easily obtained.

(xiv) By preparing the ingredients for the particles at least one resin layer is formed as an outer layer over a spherical central component by coating a resin comprising a component whose index of refraction is different from that of the central component, an image display device having capability of displaying white clearly, quickly responsive, and superior in repetition durability at a low driving voltage should be obtained.

(xv) By preparing the ingredients for the particles involving an indefinite particles Around which at least one resin layer is formed by coating a resin comprising a component whose index of refraction is different from that of the indefinite particles An image display device having capability of displaying white clearly, quickly responsive, and superior in repetition durability at a low driving voltage should be obtained.

(xvi) By preparing the ingredients for the particles containing a resin component prepared by polymerizing at least one kind of monomer selected from acrylic monomer, methacrylic monomer and styrenic monomer, an image display device easily determining positive or negative and ensuring surface charge density, capable of charge control by the selection of the monomer or blending ratio, quickly responsive, and superior in repetition durability at a low driving voltage should be obtained.

(xvii) By preparing the ingredients for the particles contained in a mixture obtained by blending at least two kinds of said particles different in both color and charge characteristic, and by settling a difference between each surface charge density within the range of 2 to 150 $\mu C/m^2$, an ideal flight and movement of particle under the formation of the electric field should be realized and accordingly, favorable images with sufficient contrast and without any unevenness should be stably obtained.

The image display device employing the particles for displaying images in accordance with the present invention is applicable to the image display unit for mobile equipments such as notebook-sized personal computers, PDAs, portable telephones, and so on; to the electron papers such as electronic books, electronic newspapers, and so on; to the bulletin boards such as signboards, posters, blackboards, and so on; to the rewritable papers substituted for papers consumed by copy machines or printers; to the image display unit for electronic calculators or home electric appliance products; and to the card image display unit for point cards, etc.

What is claimed is:

1. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

$$\text{Span} = (d0.9 - d0.1)/d0.5$$

wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein the solvent-indissoluble ratio of the ingredient particles in a solvent defined by the following equation is 50% or greater:

Solvent-indissoluble ratio (%)=$(B/A) \times 100$ wherein A represents the weight of said ingredient particles before they are immersed into the solvent, and B represents the weight of said ingredient particles after immersing them in a non-defective solvent for 24 hours at the temperature of 25° C.

2. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

Span=$(d0.9-d0.1)/d0.5$ wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein a water absorption of the ingredient particles is 3% by mass or less.

3. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

Span=$(d0.9-d0.1)/d0.5$ wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein a surface hardness of the ingredient particles measured at the temperature of 25° C. in accordance with JIS K7215 is at least 40 degrees.

4. A group of particles containing a mixture obtained by blending at least two kinds of said particles, wherein said particles are particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

Span=$(d0.9-d0.1)/d0.5$ wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) the ingredient particles involve indefinite particles around which at least one resin layer is formed by coating a resin comprising a component whose index of refraction is different from that of the indefinite particles, wherein said ingredient particles are different in both color and charge characteristics, and wherein the group of ingredient particles have a difference between each surface potential in the case where the surfaces of the ingredient particles are charged by applying a voltage of 8 kV onto a Corona generator deployed at a distance of 1 mm from the surface of each ingredient particle is 100 V or smaller at 0.3 second after the discharge.

5. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

$$\mathrm{Span}=(d0.9-d0.1)/d0.5$$

wherein d0.1 represents an ingredient particle diameter (µm) of the ingredient particles whose ratio of ingredient particles equal to or less than d0.1 is 10%, d0.5 represents an ingredient particle diameter (µm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles; or the ingredient particles at least whose surface are formed with a resin obtained by adding a charge control agent, wherein said charge control agent is at least one kind of chemical compound selected from, resin acid modified azine, resin acid modified azine compound and phenolic condensate.

6. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

$$\mathrm{Span}=(d0.9-d0.1)/d0.5$$

wherein d0.1 represents an ingredient particle diameter (µm) of the ingredient particles whose ratio of ingredient particles equal to or less than d0.1 is 10%, d0.5 represents an ingredient particle diameter (µm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein said indefinite particles are coated with a resin and wherein the coating amount of said resin is 0.01 to 30% by weight of the amount of said indefinite particles.

7. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

$$\mathrm{Span}=(d0.9-d0.1)/d0.5$$

wherein d0.1 represents an ingredient particle diameter (µm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein said ingredient particles are coated with a resin and wherein, defining the average ingredient particle diameter $d_{0.5}$ before coating resin as $r_a$ and defining the average ingredient particle diameter $d_{0.5}$ after coating resin as $r_b$, a changing factor: $R=r_b/r_a$ is 5 or smaller, and wherein $d_{0.5}$ represents an ingredient particle diameter (μm) defining that 50% of the ingredient particles are greater than $d_{0.5}$, and another 50% of the ingredient particles are smaller than $d_{0.5}$.

8. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

$$\mathrm{Span}=(d0.9-d0.1)/d0.5$$

wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein the ingredients for the particles are a group of combined ingredient particles comprising mother particles whereon many child particles of at least one kind adhere; and the ratio (B/A) between the average particle diameter $d_{0.5}$ (B) of the child particles and the average particle diameter $d_{0.5}$ (A) of the mother particles is 20 or greater, and wherein $d_{0.5}$ represents a particle diameter (μm) defining that 50% of the mother particles and child particles are greater than $d_{0.5}$, and another 50% of the mother particles and child particles are smaller than $d_{0.5}$.

9. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

$$\mathrm{Span}=(d0.9-d0.1)/d0.5$$

wherein d0.5 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein the ingredients for the particles are a group of combined ingredient particles comprising mother particles whereon many child particles of at least one kind adhere; and the average particle diameter $d_{0.5}$ of the child particles is 1 μm or smaller, and wherein $d_{0.5}$ represents a particle diameter (μm) defining that 50% of the child particles are greater than $d_{0.5}$, and another 50% of the child particles are smaller than $d_{0.5}$.

10. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:
(1) Span of ingredient particle diameter distribution defined by the following equation is less than 5:

$$\text{Span} = (d0.9 - d0.1)/d0.5$$

wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;
(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;
(3) a ratio between a surface hardness at 0° C. and a surface hardness at 100° C. is 1.7 or smaller;
(4) tensile break strength is 20 MPa or greater;
(5) Izod impact strength (with a notch) is 100 J/m or greater;
(6) abrasion loss (Taber) is 22 mg or less;
(7) tensile elastic modulus is 24.5 MPa or greater;
(8) flexural elastic modulus is 44.1 MPa or greater;
(9) tear strength is 100 kg/cm or greater; and
(10) ingredient particles involve indefinite particles around which at least one resin layer is formed by coating a resin comprising a component whose index of refraction is different from that of the indefinite particles,
wherein the ingredients for the particles are a group of combined ingredient particles comprising mother particles whereon many child particles of at least one kind adhere; and Span of ingredient particle diameter distribution defined by the following equation is less than 5:

$$\text{Span} = (d_{0.9} - d_{0.1})/d_{0.5}, \text{ and}$$

wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution.

11. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:
(1) Span of ingredient particle diameter distribution defined by the following equation is less than 5:

$$\text{Span} = (d0.9 - d0.1)/d0.5$$

wherein d0.5 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;
(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;
(3) a ratio between a surface hardness at 0° C. and a surface hardness at 100° C. is 1.7 or smaller;
(4) tensile break strength is 20 MPa or greater;
(5) Izod impact strength (with a notch) is 100 J/m or greater;
(6) abrasion loss (Taber) is 22 mg or less;
(7) tensile elastic modulus is 24.5 MPa or greater;
(8) flexural elastic modulus is 44.1 MPa or greater;
(9) tear strength is 100 kg/cm or greater; and
(10) ingredient particles involve indefinite particles around which at least one resin layer is formed by coating a resin comprising a component whose index of refraction is different from that of the indefinite particles,
wherein said ingredient particles involve indefinite particles around which at least one resin layer is formed by coating a resin comprising a component whose index of refraction is different from that of the indefinite particles and which are white.

12. Particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:
(1) Span of ingredient particle diameter distribution defined by the following equation is less than 5:

$$\text{Span} = (d0.9 - d0.1)/d0.5$$

wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;
(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;
(3) a ratio between a surface hardness at 0° C. and a surface hardness at 100° C. is 1.7 or smaller;
(4) tensile break strength is 20 MPa or greater;
(5) Izod impact strength (with a notch) is 100 J/m or greater;
(6) abrasion loss (Taber) is 22 mg or less;

(7) tensile elastic modulus is 24.5 MPa or greater;
(8) flexural elastic modulus is 44.1 MPa or greater;
(9) tear strength is 100 kg/cm or greater; and
(10) ingredient particles involve indefinite particles around which at least one resin layer is formed by coating a resin comprising a component whose index of refraction is different from that of the indefinite particles, wherein the ingredient particles are insulating particles with volume specific resistance of $1 \times 10^{10}$ Ω·cm or greater.

13. An image display device which displays images by flying and moving at least one kind of particles enclosed between a pair of facing substrates of which at least one is transparent and across the substrates, an electric field being applied, wherein said particles are particles for displaying images used in an image display device which displays images by flying and moving at least one group of particles enclosed between a pair of facing substrates of which at least one is transparent and across the substrates, an electric field being applied, wherein the ingredients for the particles satisfy at least one requirement among the following:

(1) Span of ingredient particle diameter distribution defined by the following equation is less than 5:

$$\mathrm{Span} = (d0.9 - d0.1)/d0.5$$

wherein d0.1 represents an ingredient particle diameter (μm) of the ingredient particles whose ratio of ingredient particles equal to or less than d0.1 is 10%, d0.5 represents an ingredient particle diameter (μm) defining that 50% of the ingredient particles are greater than d0.5, and another 50% of the ingredient particles are smaller than d0.5, d0.9 represents an ingredient particle diameter of the ingredient particles whose ratio of ingredient particles equal to or smaller than d0.9 is 90% each in the ingredient particle diameter distribution;

(2) in the case where the surfaces of the ingredient particles are charged by applying a voltage of 8 kV onto a Corona generator deployed at a distance of 1 mm from the surface of the ingredient particles, a surface potential of the ingredient particle 0.3 second after the discharge is greater than 300 V;

(3) a ratio between a surface hardness at 0° C. and a surface hardness at 100° C. is 1.7 or smaller;

(4) tensile break strength is 20 MPa or greater;

(5) Izod impact strength (with a notch) is 100 J/m or greater;

(6) abrasion loss (Taber) is 22 mg or less;

(7) tensile elastic modulus is 24.5 MPa or greater;

(8) flexural elastic modulus is 44.1 MPa or greater;

(9) tear strength is 100 kg/cm or greater; and

(10) ingredient particles involve indefinite particles around which at least one resin layer is formed by coating a resin comprising a component whose index of refraction is different from that of the indefinite particles, wherein cavities between said substrates are saturated with air having relative humidity of 60% RH or smaller at 25° C.

\* \* \* \* \*